US008886796B2

(12) United States Patent
Calder et al.

(10) Patent No.: US 8,886,796 B2
(45) Date of Patent: Nov. 11, 2014

(54) LOAD BALANCING WHEN REPLICATING ACCOUNT DATA

(75) Inventors: Bradley Gene Calder, Bellevue, WA (US); Niranjan Nilakantan, Seattle, WA (US); Shashwat Srivastav, Seattle, WA (US); Jiesheng Wu, Redmond, WA (US); Abdul Rafay Abbasi, Redmond, WA (US); Shane Mainali, Duvall, WA (US); Padmanabha Chakravarthy Uddaraju, Bellevue, WA (US); Arild Einar Skjolsvold, Kenmore, WA (US); Hemal Khatri, Redmond, WA (US); Ju Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 125 days.

(21) Appl. No.: 13/113,776

(22) Filed: May 23, 2011

(65) Prior Publication Data

US 2012/0303791 A1 Nov. 29, 2012
US 2014/0258499 A9 Sep. 11, 2014

Related U.S. Application Data

(63) Continuation-in-part of application No. 12/258,050, filed on Oct. 24, 2008.

(51) Int. Cl.
*G06F 15/173* (2006.01)
*G06F 9/50* (2006.01)
*H04L 29/08* (2006.01)

(52) U.S. Cl.
CPC ...... *G06F 9/5083* (2013.01); *G06F 2206/1012* (2013.01); *H04L 67/1002* (2013.01)
USPC .......................................... 709/224

(58) Field of Classification Search
CPC ................................... H04L 67/1002
USPC ............................................ 709/224
See application file for complete search history.

(56) References Cited

U.S. PATENT DOCUMENTS 5,987,468 A * 11/1999 Singh et al. ................... 1/1
6,163,856 A * 12/2000 Dion et al. ................ 714/4.11

(Continued)

FOREIGN PATENT DOCUMENTS

JP 2006-526191 11/2006
JP 2006-351040 12/2006

OTHER PUBLICATIONS

U.S. Appl. No. 13/113,718, applicant Bradley Gene Calder, titled "Replication Processes in a Distributed Storage Environment", filed May 23, 2011, 55 pages.

(Continued)

*Primary Examiner* — Asad Nawaz
*Assistant Examiner* — Syed S Ali
(74) *Attorney, Agent, or Firm* — Ben Tabor; David Andrews; Micky Minhas

(57) ABSTRACT

Embodiments of the present invention relate to invoking and managing load-balancing operation(s) applied to partitions within a distributed computing environment, where each partition represents a key range of data for a storage account. The partitions affected by the load-balancing operation(s) are source partitions hosted on a primary storage stamp and/or destination partitions hosted on a secondary storage stamp, where the primary and secondary storage stamps are located in geographically distinct areas and are equipped to replicate the storage account's data therebetween. The load-balancing operation(s) include splitting partitions into child partitions upon detecting an increased workload as a result of active replication, merging partitions to form parent partitions upon detecting a reduction in workload as a result of decreased processing-related resource consumption, or offloading partitions based on resource consumption. A service within a partition layer of the storage stamps is responsible for determining when to invoke these load-balancing operation(s).

20 Claims, 9 Drawing Sheets

(56) References Cited

U.S. PATENT DOCUMENTS

| | | | |
|---|---|---|---|
| 7,281,031 B1 | 10/2007 | Wang et al. | |
| 7,844,851 B2 | 11/2010 | Cosmadopoulos et al. | |
| 2002/0184327 A1* | 12/2002 | Major et al. ............... | 709/213 |
| 2004/0003086 A1* | 1/2004 | Parham et al. ............. | 709/226 |
| 2006/0039364 A1* | 2/2006 | Wright ....................... | 370/352 |
| 2007/0239791 A1* | 10/2007 | Cattell et al. ............... | 707/200 |
| 2008/0183991 A1* | 7/2008 | Cosmadopoulos et al. .. | 711/162 |
| 2008/0270605 A1* | 10/2008 | Berstis et al. .............. | 709/224 |
| 2010/0106934 A1* | 4/2010 | Calder et al. ............... | 711/173 |
| 2011/0276692 A1* | 11/2011 | Waldman et al. ........... | 709/226 |
| 2012/0011176 A1* | 1/2012 | Aizman ...................... | 707/822 |

OTHER PUBLICATIONS

U.S. Appl. No. 13/113,702, applicant Bradley Gene Calder, titled "Synchronous Replication in a Distributed Storage Environment", filed May 23, 2011, 62 pages.

U.S. Appl. No. 13/113,795, applicant Bradley Gene Calder, titled "Implementing Failover Processes Between Storage Stamps", filed May 23, 2011, 80 pages.

U.S. Appl. No. 13/113,634, applicant Bradley Gene Calder, titled "Geo-Verification and Repair", filed May 23, 2011, 30 pages.

U.S. Appl. No. 13/113,729, applicant Bradley Gene Calder, titled "Versioned and Hierarchical Data Structures and Distributed Transactions", filed May 23, 2011, 25 pages.

U.S. Appl. No. 13/113,808, applicant Bradley Gene Calder, titled "Storage Account Migration Between Storage Stamps", filed May 23, 2011, 68 pages.

U.S. Appl. No. 13/113,688, applicant Bradley Gene Calder, titled "Asynchronous Replication in a Distributed Storage Environment", filed May 23, 2011, 52 pages.

"SQL Azure Achitecture—Competitive Differentiation", Retrieved on: Dec. 29, 2010, 2 pages Available at: http://www.infoq.com/news/2010/11/delaney-SQLAzure.

"Deployment Guidelines for Exchange Server Multi-Site Data Replication", Retrieved on: Dec. 29, 2010, 6 pages Available at: http://technet.microsoft.com/en-us/library/bb124066%28EXCHG.65%29.aspx.

"High Availability, Load Balancing, and Replication", Retrieved on: Dec. 29, 2010, 4 pages Available at: http://www.postgresql.org/docs/8.3/static/high-availability.html.

"Failover and Replication in a Cluster", Retrieved on: Dec. 29, 2010, 14 pages Available at: http://download.oracle.com/docs/cd/E13222_01/wls/docs81/cluster/failover.html.

"GEO LoadMaster Overview", Retrieved on: Dec. 29, 2010, 1 page Available at: http://www.kemptechnologies.com/emea/server-load-balancing-appliances/geo-loadmaster/glm-overview.html.

* cited by examiner though only the limitations "comprising," "including," and "having" are used in the description below with reference to at least one feature or element, any relationship or combination of steps set forth in the claims or disclosed herein, unless specifically ordered, should not be interpreted or described as implying any particular order.

LOAD BALANCING WHEN REPLICATING ACCOUNT DATA

CROSS-REFERENCE TO RELATED APPLICATIONS

This application is a continuation-in-part of, and claims priority from, U.S. application Ser. No. 12/258,050 filed Oct. 24, 2008, entitled PARTITION MANAGEMENT IN A PARTITIONED, SCALABLE, AND AVAILABLE STRUCTURED STORAGE.

BACKGROUND

Often, distributed computing environments rely on geographically separate components, which may be connected via a network, to perform data storage and manipulation (e.g., read, write, and modify). A customer of these distributed computing environments may desire to have data for their account(s) maintained in a particular geographic location while the data is being backed up in a separate, geographically removed location. For example, the customer may desire to have their data stored in two or more geographical locations that are separate from one another to reduce potential data-availability issues surrounding a natural disaster. Further, a customer may decide, on an account-by-account basis, to have data maintained and/or replicated in a variety of geographical locations. For instance, for some accounts, the customer may require a plurality of locations that are geographically diverse while, for other accounts, the customer may select a single geographic location to hold sensitive data, thereby favoring privacy over duplicity. Providing a system and methodology for maintaining data at one or more locations while providing load-balancing techniques that facilitate replication of that data across the locations is provided hereinafter.

SUMMARY

Embodiments of the present invention relate to systems, methods, and computer storage media for identifying when to balance processing load(s) between nodes of a distributed computing environment and for carrying out load-balancing operations on those partitions that are identified as candidates for receiving either a merge or a split. In one instance, the present invention introduces technology for performing a method including monitoring a workload assigned to a subject partition being hosted on a node of a storage stamp. Typically, the subject partition represents a key range of data for a particular storage account. The method also includes detecting that a level of the subject partition's workload has exceeded a predefined threshold. Upon detecting this increased workload on the subject partition, the subject partition is identified as a candidate for receiving a load-balancing operation. In embodiments, the load-balancing operation includes splitting and/or merging the subject partition. The fact that the subject partition is identified as a candidate for receiving a load-balancing operation may be stored in a record, at least temporarily, as an indication that splitting or merging is ostensibly scheduled to occur with respect to the subject partition.

In operation, load-balancing operations (e.g., merging partitions onto a single partition server or splitting a partition into two or more instances that reside on respective partition servers) addresses an issue inherent to storage-stamp topology where partitions residing on a primary storage stamp may be differently sized and distributed in comparison to partitions residing on a secondary storage stamp. Typically, load-balancing operation(s) are triggered to reduce the time necessary for a bootstrap to occur, to maintain a flow of live traffic from a primary storage stamp during replication, or to ensure that replay on a partition server within the secondary storage stamp will keep pace with the live traffic. Generally, the rate at which the bootstrap/live traffic/replay are carried out is dictated by a customer's specifications in an SLA established for replication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which form a part of the specification and are to be read in conjunction therewith which are incorporated by reference herein and wherein.

DETAILED DESCRIPTION

Figure 1:
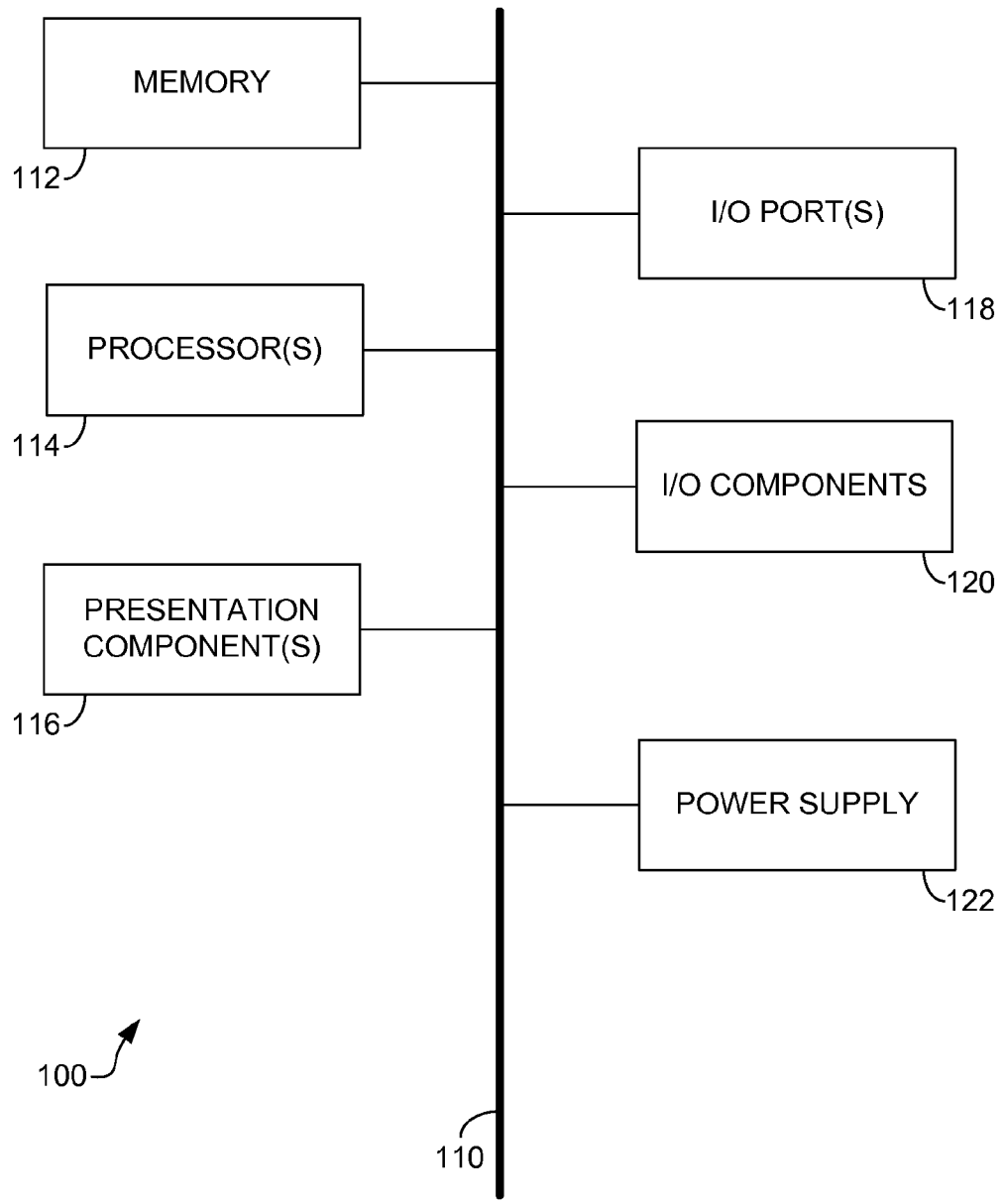
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for load balancing between nodes (e.g., partition servers) at a storage-account level. In particular embodiments, the load-balancing operations are directed toward partitions (e.g., key ranges of data within the storage account) hosted on the partition servers of a storage stamp. In operation, load-balancing operations (e.g., merging partitions onto a single partition server or splitting a partition into two or more instances that reside on respective partition servers) addresses an issue of storage-stamp topology where partitions residing on a primary storage stamp may be differently sized and distributed in comparison to partitions residing on a secondary storage stamp. Typically, load-balancing operation(s) are triggered to reduce the time necessary for a bootstrap to occur, to maintain a flow of live traffic from a primary storage stamp during replication, or to ensure that replay on a partition server within the secondary storage stamp will keep pace with the live traffic. Generally, the rate at which the bootstrap/live traffic/replay are carried out is dictated by a customer's specifications in an SLA established for replication.

In an exemplary embodiment, load balancing involves splitting or merging one or more partitions based on various parameters. For example, the parameters being considered for invoking splitting and/or merging may include at least one of the following: (a) the number of partitions on the primary storage stamp for a set of data in relation to the number of partitions that data is being replicated to on the secondary storage stamp; (b) log sizes at each of the storage stamps; (c) the geo message log (GML) size to be replayed on the secondary storage stamp; and (d) during a bootstrap, the number of partitions still being processed via the bootstrap is less than the number of partition servers. This is used to spread out the load across the partition severs (e.g., invoke splitting such that each of the partition servers are involved in bootstrap). In this way, partition load balancing allows replication to be fast from the perspective of the primary storage stamp and assists the secondary storage stamp in keeping pace with live traffic from the primary storage stamp.

Accordingly, in one aspect, the present invention provides a computer-implemented method in a distributed computing environment utilizing a processor and memory for identifying when to balance at least one processing load between nodes of the distributed computing environment. The method includes monitoring a workload assigned to a subject partition being hosted on a first node of a storage stamp. Typically, the subject partition represents a key range of data for a particular storage account. The method also includes detecting that a level of the subject partition's workload has overcome a predefined threshold. Upon detecting this increased workload on the subject partition, the subject partition is identified as a candidate for receiving a load-balancing operation. In embodiments, the load-balancing operation includes splitting and/or merging the subject partition. The fact that the subject partition is identified as a candidate for receiving a load-balancing operation may be stored in a record, at least temporarily, as an indication that splitting or merging is ostensibly scheduled to occur with respect to the subject partition.

In another aspect, the present invention provides computer-storage media having computer-executable instructions embodied thereon, that when executed by a computing system having a processor and memory, cause the computing system to perform a method for triggering load-balancing operations on partitions of a storage account. The method involves carrying out several calculations to ascertain whether a load-balancing operation is optimal. For instance, the method may include calculating a log size for a subject partition by, in part, recognizing a number of pending transactions with the subject partition's log. Typically, the subject partition represents a key range of the storage account hosted on a partition server. In another instance, the method may include calculating an average value of log sizes for partition(s) within a common storage stamp as the subject partition, where the partition(s) and the subject partition represent data of a common storage account.

Once the calculations above are carried out, the method continues with comparing the subject partition's log size against the average value of log sizes calculated for the one or more partitions. Upon comparison a load balancing operation is invoked when the subject partition's log size meets the average value of log sizes adjusted by a predefined factor. In an exemplary embodiment, invoking the load-balancing operation includes one or both of the following steps: (a) when the subject partition's log size overcomes the average value of log sizes adjusted upward by the predefined factor, triggering a split of the subject partition into two or more child partitions; or (b) when the subject partition's log size falls below the average value of log sizes reduced by the predefined factor, triggering a merge between the subject partition and the one or more partitions to form a child partition.

A third aspect of the present invention provides a computer system within a distributed networking environment for controlling load balancing of partitions. The system includes a primary and a secondary storage stamp. As will be discussed in detail below, a storage stamp may comprise one or more nodes (e.g., racks of blades or servers carved out of a data center, a set of data centers, or just the data center itself). In embodiments, the primary storage stamp that includes first partition server(s) that host source partition(s). As briefly mentioned above, the source partition(s) represent a key range of initial data associated with a storage account. Generally, the secondary storage stamp includes second partition server(s) that host destination partition(s), where the destination partition(s) represent a key range of replicated data associated with a storage account. Typically, the replicated data substantially mirrors content of the initial data. Further, in many cases, the source partition(s) and the destination partition(s) disagree in number of partitions the data is spread across.

In one embodiment, the system also includes a service within partition layer(s) of the primary storage stamp and/or the secondary storage stamp, where the service acts to increase or decrease instances of the source or destination partition(s) such that they more closely correspond in number. However, the service generally in isolation on one partition layer with respect to another partition layer. For instance, the service currently does not explicitly rely on load-balancing communications between the storage stamp and the secondary storage stamp, or vice versa. That is, the primary and secondary storage stamp identify internally what to load balance and when. However, the secondary storage stamp may implicitly learn about the partitioning established at the primary storage stamp based on the key ranges that the primary storage stamp sends out in its messages to the secondary storage stamp. By way of example, if a given destination partition at the secondary storage stamps encounters many smaller key ranges, or buckets, from different destination partitions residing on the secondary storage stamp, then the service on the secondary storage stamp knows that the partitioning on the primary storage stamp is much more spread out. As a result, the service on the secondary storage stamp may, or may not, spread out partitions over more partition servers accordingly. Of course, if the secondary storage stamp is not able to keep pace with the primary storage stamp in terms of replay during bootstrapping, for example, then this lag in reply may be another indication to the service that performing a split operation on the secondary storage stamp should be considered in order to catch up on replication.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including handheld devices, consumer electronics, general-purpose computers, specialty computing devices, servers, routing devices, distributed computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," "server," "data store" etc., as all are contemplated within the scope of FIG. 1 and reference to "computer" or "computing device."

Computing device 100 typically includes a variety of computer-readable media. By way of example, and not limitation, computer-readable media may comprise the following non-transitory computer-storage media: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other medium that can be used to encode desired information and be accessed by computing device 100. In an exemplary embodiment, the computer-readable media is a non-transitory media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like. It is understood that the computing device 100 may be manifested in a variety of forms. For example, portions of the computing device 100 may be physically located in a first geographic location while other portions may be physically located in a different geographical location. Consequently, it is contemplated that various devices, services, applications, and layers may be distributed across a variety of locations while still achieving the desired results traditionally applicable to the computing device 100.

Figure 2:
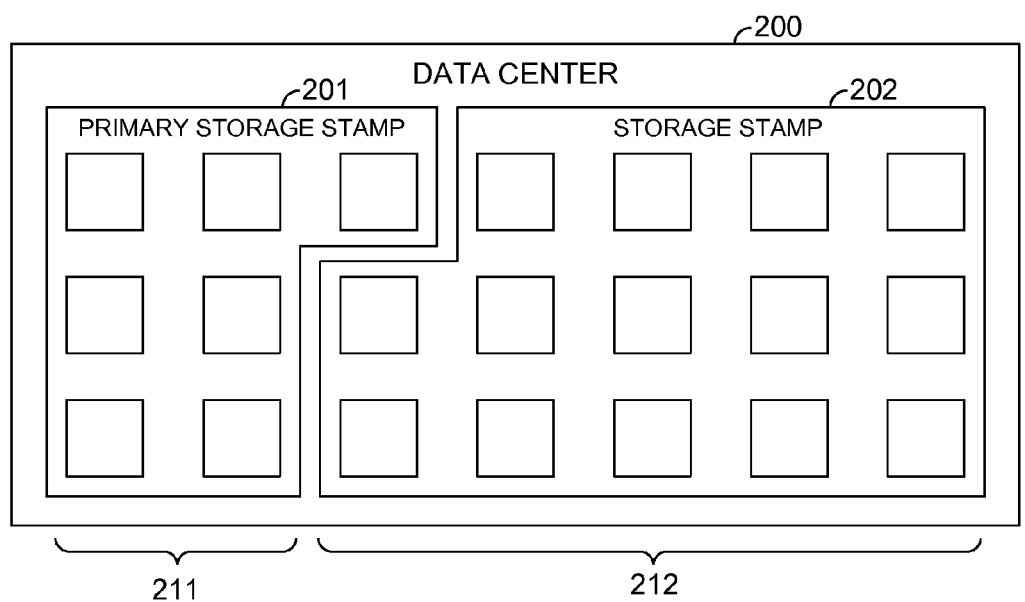
FIG. 2 depicts a block diagram illustrating storage stamps within an exemplary data store connected to a distributed computing environment, in accordance with embodiments of the present invention.

With reference to FIG. 2, a block diagram is provided illustrating an exemplary data center 200, in accordance with embodiments of the present invention. The data center 200 generally represents hardware devices configured to accommodate and support operation of software, component programs, or instances of roles, of a service application according to a service model. These roles may run on top of compute stamps (not shown). Further, the hardware devices may be configured to accommodate and support data storage and retrieval, where the data is maintained in an accessible manner to the service application. This data is stored, at least temporarily, at a primary storage stamp 201 and/or a storage stamp 202 (to be discussed hereinafter).

The data center 200 includes various resources interconnected via a network cloud. These resources, as described herein, may include software components (e.g., location service 300 of FIG. 3) as well as tangible hardware elements, such as racks housing blades, servers, and other computing devices. The network cloud interconnects these resources internally and externally with other resources, which may be distributably placed across various other data stores, and may recognize resources hosted by geographically distinct locations in order to establish communication therebetween. The network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

Generally, the data center 200 accommodates a distributed system of processing equipment, or nodes 211 and 212, that can be subject to various classes of failures. In general, the nodes represent any type of computing devices or machines, such as, for example, computing device 100 described above with reference to FIG. 1. By way of example only, and not limitation, the nodes 211 and 212 may include one or more of blades, racks, a personal computer, a desktop computer, a laptop computer, a handheld device, a mobile handset, consumer electronic device, and the like.

In embodiments, the nodes 211 and 212 may be grouped into stamps 201 and 202, respectively. In one instance, the groups of nodes 211 and 212 are formed such that not all data within the data center 200 will concurrently fall offline during a particular class of failures (specified as fault domains) or updates (specified as update domains). Accordingly, persistence of data within the data center 200 is preserved when saved across the stamps 201 and 202 or when saved to fault domains carved out of nodes within a single stamp, unless a geographic disaster occurs that destroys the entire data center 200. Typically, fault domains are abstracted from the configuration of resources of the data center 200 in order to cope with certain classes of internal failures and to make assumptions with respect to the kind of failures expected and the conditions under which such failures can occur.

In operation, a customer may specify in a service level agreement (SLA) that they desire intra-stamp replication of data associated with their storage account. This specification may be due to the need to maintain all sensitive data within a single data center 200 while providing durability by maintaining a local duplicate copy. As such, intra-stamp replication is focused on making sure the customer's data is replicated durably within a single stamp, such as either stamp 201 or 202 of FIG. 2. Generally, intra-stamp replication promotes generating enough replicas/copies of the customer's data across different nodes, in different fault domains, in order to keep the data durable within the single stamp. In embodiments, intra-stamp replication employs a form of data spreading that allows the system to quickly re-replicate data to a healthy number of instances when a node is lost.

Although the nodes 211 and 212 are described above as being grouped according to fault and/or update domains, it should be understood and appreciated that other types of suitable criteria for grouping the nodes 211 and 212 into stamps 201 and 202, respectively, may be used, and that embodiments of the present invention are not limited to the grouping methodology described herein. Further, it will be understood and appreciated by those of ordinary skill in the art that the data center 200 shown in FIG. 2 is merely an example of one suitable portion of a distributed hosting environment and is not intended to suggest any limitation as to the scope of use or functionality of embodiments of the present invention. Neither should the data center 200 be interpreted as having any dependency or requirement related to any single resource or combination of resources illustrated therein. Further, although the various blocks of FIG. 2 (e.g., stamps 201 and 202) are shown with lines for the sake of clarity, in reality, delineating various components is not so clear, and metaphorically, the lines would more accurately be grey and fuzzy.

Figure 3:
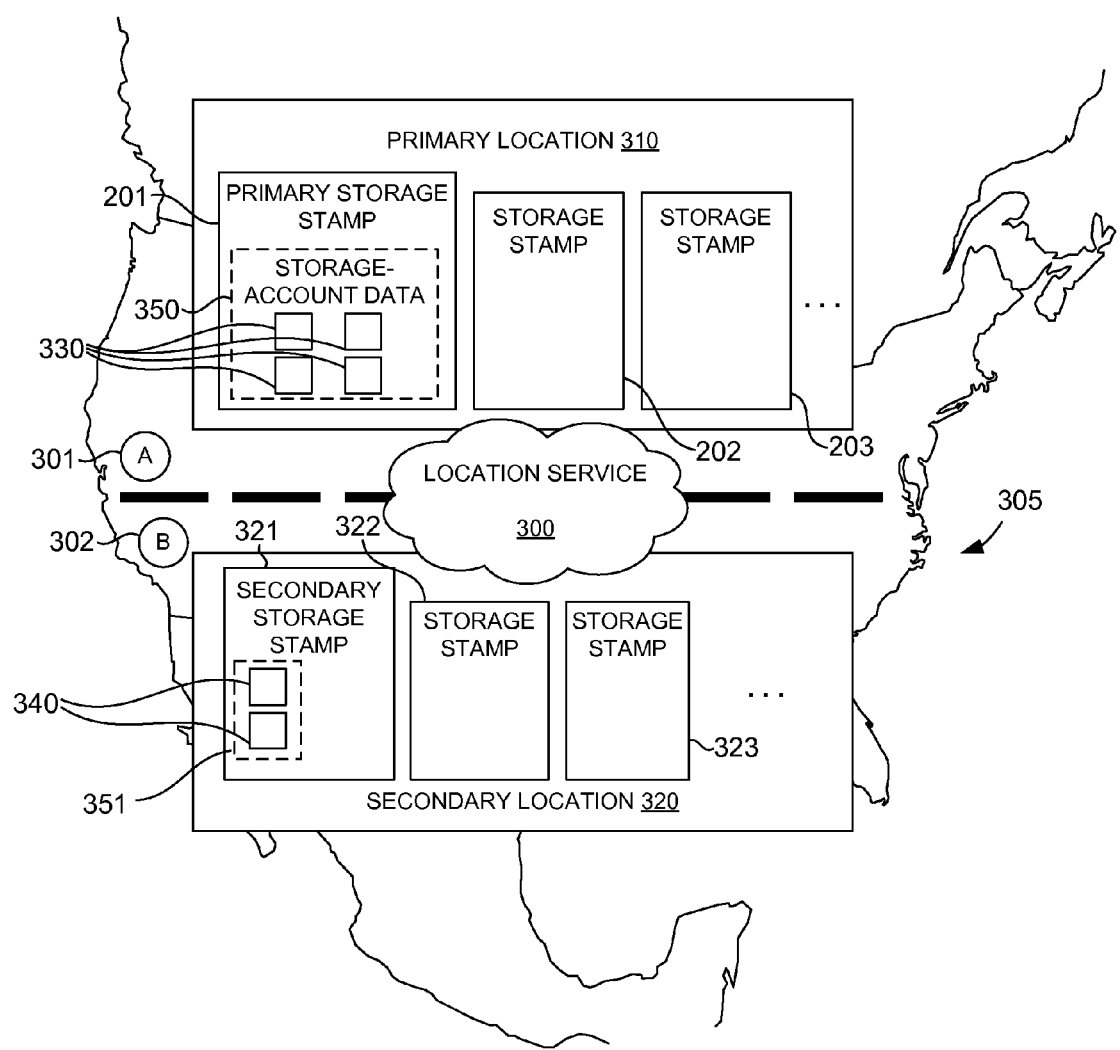
FIG. 3 depicts a block diagram of an exemplary geographic region with a primary and secondary geographic location therein, in accordance with embodiments of the present invention.

Turning now to FIG. 3, a block diagram is provided showing an illustrative geographic region ("geo region") 305. (It should be noted that like reference numerals throughout the set of figures are used to indicate similarly configured components in the various views; however, some aspects of these components sharing like reference numerals may vary according to embodiments of the present invention.) In general, the geo region 305 is a collection of geographical locations, such as primary location 301 and secondary location 302, grouped together by a political and/or governmental boundary. For example, the geo region 305 may represent the United States, while a second geo region may include Europe, and a third geo region may include Asia-Pacific regions.

As will be discussed in greater detail hereinafter, a customer of a cloud-computing service may desire to replicate data within the geo region 305, but at different geographical location(s) within the geo region. For example, the customer may desire to maintain all of their data within the United States of America (as opposed to replicating the data in a different geo region) to be subjected to the laws governing the United States of America. But, because of a business continuity plan (disaster recovery plan) or other data-contingency requirement, the client may specify the data to be replicated in different geographical locations ("locations") within the United States. As a result, the data may be accessed through the primary location 310, which may be in a first geographic location (e.g., northern U.S.A). This data may also be replicated in a secondary location 320 (e.g., southern U.S.A.), which is geographically distributed from the primary location 310.

As used herein, the phrase "geographical location" or term "location" is not meant to be limiting to any particular hardware and may encompass any amount of nodes that are capable of hosting data thereon. In one instance, the geographic location(s) include one or more data centers that each include one or more storage stamps (to be defined hereinafter). For example, the primary location 310 includes the storage stamps 201 (primary storage stamp), 202, and 203, while the secondary location includes storage stamps 321 (secondary storage stamp), 322, and 323. As illustrated, a given data center may include both a primary and secondary storage stamps. In addition, a single primary storage stamp may assume the role of a primary storage stamp with respect to some accounts and may assume the role of a secondary stamp to with respect to other accounts. Further, a single storage stamp may serve as a primary storage account to just a portion of a given storage account, while the same storage stamp may serve as a secondary stamp to a different portion of that storage account. In this case, there exists other storage stamps that may serve as the primary or secondary storage stamps for complimentary portions of the storage account.

In addition, one attribute of the geographic locations 310 and 320 is the physical relationship between each other. Generally, the locations 310 and 320 are separated by a substantial physical distance such that the secondary physical location 320 may be insulated from a natural disaster and/or other business-interfering activity (e.g., political unrest), referred to hereinafter as "geographic disasters," affecting the primary location 310. In one example, the primary location 310 may represent a U.S.A.-based grouping of storage stamps in a city (e.g., Seattle, Wash.) residing in the northern U.S.A., while the secondary location 320 may represent a U.S.A.-based grouping of storage stamps in a city (e.g., Atlanta, Ga.) residing in the southern U.S.A.

As used herein, the phrase "storage stamp" or term "stamp" is meant to broadly refer to a collection of physical drives or other computer-readable memory, which may be coupled to one or more processors, such as compute stamps. For example, a storage stamp may be comprised of a group of nodes (see FIG. 2), a cluster of 10-20 racks of storage that maintains 2-20 petabytes of storage, or at least one data center. However, it should be appreciated and understood that a storage stamp can provide greater or less storage capacity than discussed above. Generally, storage stamps positioned with a common geographic location, such as stamps 201, 202, and 203 within the primary location 310, may be geographically close in proximity (e.g., within a common data center). As a result of the relatively close proximity to one another, a high level of connectivity exists between these physically proximate storage stamps. Further, compute stamps that run a customer's service application may be positioned within a common geographic location as the storage stamps in order to provide affinity between computation and storage via a shared switch or backbone router. However, as a disadvantage, hosting all of a customer's data on just storage stamps that are generally in close proximity to one another (e.g., stamps 201, 202, and 203 in the common primary geographic location 310) exposes the customer to complete data loss if a geographic disaster affects the geographic location in which storage stamps are situated.

Accordingly, aspects of the present invention provide for replication of data within at least one storage account between two or more storage stamps that may be geographically separate from one another, such as the primary storage stamp 201 and secondary storage stamp 321. That is, it is contemplated that data maintained in the primary storage stamp 201 in the primary location 310 is replicated to the secondary storage stamp 321 in the secondary location 320, such that the secondary location 320 and the primary location 310 are geographically separated by a sufficient distance (e.g., 100 miles, 1,000 miles, 10,000 miles, etc.). It is further contemplated that the secondary storage stamp 321 is typically within the same geo region 305 as the primary storage stamp 201, but secondary storage stamp 321 resides in a different geographic location than the primary storage stamp 201.

In embodiments, the customer associated with the storage-account data may select a location of the primary storage stamp 201 (e.g., primary location 310). Further, it is contemplated that the secondary storage stamp(s) (e.g., secondary storage stamp 321) are automatically selected for the customer based on a number of criteria, either provided by the customer or based on reliability, redundancy, and/or availability measures. However, it is also contemplated that either the primary location 310 and/or the secondary location 320 are selected by the customer or selected for the customer.

It should be noted that this exemplary distributed system architecture of FIG. 3 is but one example of a suitable environment that may be implemented to carry out aspects of the present invention; and is not intended to suggest any limitation as to the scope of use or functionality of the invention. Neither should the illustrated exemplary system architecture be interpreted as having any dependency or requirement relating to any one or combination of the stamps 201-203 and 321-323 as illustrated. It will be understood by those of ordinary skill in the art that the stamps 201-203 and 321-323 illustrated in FIG. 3 are exemplary in nature and in number and should not be construed as limiting.

Embodiments of the present invention contemplate providing the primary location 310 and the secondary location 320 in communicative coupling via the location service 300, occasionally referred to as an Location Service (LS). This communicative coupling, typically over a networking infrastructure, allows the location service 300 to control inter-stamp replication between the stamps 310 and 321. Generally, inter-stamp replication is focused on ensuring some or all of the data from a customer's storage account 350 is replicated efficiently from the primary storage stamp 201 to its secondary storage stamp(s) (e.g., secondary storage stamp 321), if any are designated by the customer. When the storage-account data 350 is written to the primary storage stamp 201, it can be made to be durable using the process of inter-stamp replication.

When the storage-account data 350, or accountKey, has one or more secondary storage stamps designated thereto, the process of inter-stamp replication may replicate the data through the employment of transactions, which are forwarded to the designated secondary storage stamp(s). In embodiments, the term "transactions" broadly refers to information representing a portion of the storage account data 350, or a modification thereto, that can be deterministically replayed at the secondary storage stamps to produce the same values as presently stored in the primary storage stamp 201. Upon replaying the transaction on the secondary storage stamp(s), a result of the replay is committed to the secondary storage stamp(s). This process of inter-stamp replication also involves bootstrapping (discussed in more detail below) the storage-account data 350, or part of the data 350 depending on the situation, from the primary storage account 201 to another stamp upon adding a new secondary storage account or assisting the recovery from a geographic disaster affecting storage stamp(s) on which at least a portion of the storage-account data 350 was maintained. With reference to FIG. 3, inter-stamp replication provides for maintaining the storage-account data 350 in the primary storage stamp 201 in northern U.S.A. and a replication of the storage-account data 351 in the secondary storage stamp 321 in southern U.S.A.

Further, inter-stamp replication is responsible for keeping the data healthy and current within each corresponding secondary storage stamp by sending any changes (e.g., updates, deletions, modifications, additions, and the like) from the primary storage stamp 201 to its secondaries. Thus, inter-stamp replication enhances disaster-recovery scenarios across the various stamps. For instance, in the case of a geographic disaster to the primary storage stamp 201, the location service 300 may trigger a failover to the secondary storage stamp 321 and designate the secondary storage stamp 321 as the new primary for the storage-account data 350.

It should be noted that the inter-stamp replication generates a full replicated set of the storage-account data 350, as opposed to simple copies. Thus, upon the occurrence of a failover due to a geographic disaster affecting the primary storage stamp 201, the storage-account data 350 that is replicated to the secondaries is immediately ready to be used to serve up the contents of the storage-account data 351 to a client (e.g., service application or other tenant of the cloud-computing service that is associated with the customer) as needed. In contrast to copies of data, there is no inherent latency required to reconstruct the replicated storage-account data 351 at the new primary (secondary storage stamp 321). In this way, each stamp (e.g., primary and secondary or secondaries) maintains a level of replicated data from the customer's storage account to allow individual storage stamps to deal with failures (e.g., corrupt replica, lost disk, lost node, or lost rack) completely independently and in isolation within their own respective geographic location. In this way, the system described herein implements a logic that maintains sufficient replicas of the geo-replicated data at both the primary and secondary storage stamps to ensure that, upon the occurrence of a failover, there exists readily accessible data—allowing the primary and secondary storage stamps the ability to independently address rack, disk, node, etc., failures by re-replicating the data internally therein (i.e., intra-stamp replication), instead of relying upon external support from a remote storage stamp (i.e., inter-stamp replication). Embodiments of inter-stamp replication are discussed in more detail below with respect to FIG. 5.

Referring again to FIG. 3, the configuration and implementation of partitions will now be discussed. In an exemplary embodiment, a storage stamp may host a number of partitions associated with a particular storage account. As illustrated, the storage-account data 350 may be divided amongst the partitions 330 while the replicated storage-account data 351 may be divided amongst the partitions 340. Further, in some embodiments, the storage-account data 350 for the particular storage account is allowed to span across various storage stamps and/or across various locations.

As used herein, the term "partition," is not meant to be limiting, but generally pertains to a subset of data, or key range, of a customer's storage account. This partitioned data may be hosted on distributed nodes, partition servers, or other storage capacity allocated to a given storage stamp. Therefore, a particular and discrete amount of data hosted within a partition server of a storage stamp may be identified, at least in part, based on a partition identifier of the partition hosted on an associated partition server. In an exemplary embodiment, partitions may be utilized to manage one or more storage accounts utilizing a storage stamp. For instance, partitions associated with multiple storage accounts may persist on a single partition server within a single storage stamp. Further, it is contemplated that a customer of a single storage account may utilize two or more partitions (as will be discussed hereinafter) on various partition servers within a single storage stamp to maintain an original instance or a replicated copy of their storage-account data.

The primary storage stamp 201 is depicted as having four partitions 330 that comprise the storage-account data 350, where portions of the storage-account data 350 may be discovered by identifying which key ranges are assigned to each of the respective partitions 330. The secondary storage stamp 321 is depicted as having two partitions 340 that comprise the replicated storage-account data 351, where portions of the replicated storage-account data 351 may be discovered by identifying which key ranges are assigned to each of the respective partitions 340. As illustrated, the number of partitions 330 in the primary storage stamp 201 is different from the number of partitions 340 in the secondary storage stamp 321. This is due to the feature that storage-account data 350 may be partitioned differently than replicated storage-account data 351 based on the constraints and/or design of the respective stamps as well as the load/traffic on the stamps. Consequently, the key ranges of the data in the customer's storage account are divided differently between the partitions 330 and the partitions 340.

Although not shown in FIG. 3, the storage stamps 201 and 321 may each include partitions associated with other customer storage accounts. Further, the partition servers that host the partitions 330 and the partition servers that host the partitions 340 may also host any number of partitions associated with other customer storage accounts. For instance, a partition server allocated to the primary storage stamp 201 may host one or more of the partitions 330, which represent a discrete amount of the storage-account data 350, as well as thousands of other partitions that represent discrete amounts of data from a multitude of various other storage accounts. It is understood that any number of storage accounts and any number of partitions may be provided in the above example, and the illustration is provided for explanation purposes. Further, as stated above, a given storage stamp may act as both a primary and secondary storage stamp for different storage accounts. Also, a single storage account may be spread across multiple storage stamps. In this instance when the single storage account may be spread across multiple storage stamps, the storage account may have the portion of its data designated as primary and the portion of its data designated as secondary residing on the same storage stamp.

Figure 4:
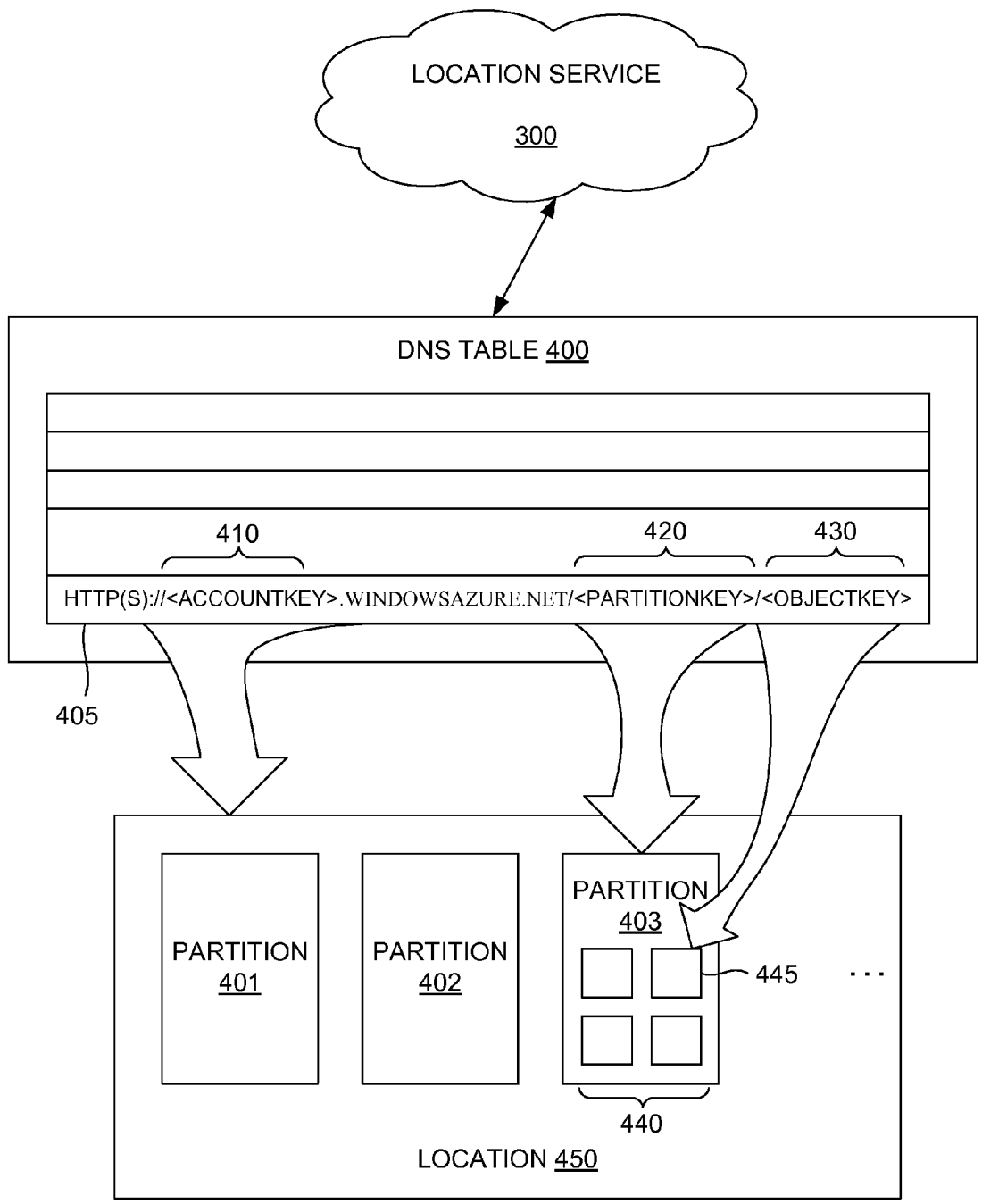
FIG. 4 depicts a schematic diagram of components comprising an entry of a domain name server (DNS) table, in accordance with embodiments of the present invention.

Turning to FIG. 4, a schematic diagram illustrating an exemplary domain name server (DNS) table 400, according to embodiments of the present invention, will now be employed to discuss a method for discovering an object within a partition within a stamp of a location. Initially, as mentioned above, each stamp is allowed to store and manage its data in partitions differently (e.g., according to constructs individual to each particular stamp). Thus, each location is enabled to load balance across the partition servers allocated to a particular stamp independently of other stamps. Further, stamps at distinct geographic locations may manage and organize partitions representing substantially similar account-storage data in distinct ways. One aspect of the present invention that allows for variation in partition-management schemes is the configuration of an internal storage namespace used to find, read from, write to, and/or modify content on partitions.

This internal storage namespace may be separate and independent between storage stamps. For example, stamps independently maintain a mapping in the form of <accountKey>/<partitionKey>/<objectKey> for each object they store to their initial and/or replicated state within the stamps, respectively. This mapping is allowed to be completely different on each storage stamp. First, the <accountKey> 410 is assigned to a specific storage account being hosted by one or more stamps. In operation, the location service 300 may rely on an entry 405 within the DNS table 400 to identify those locations (e.g., location 450) that are mapped to the specific storage account. Second, the <partitionKey> 420 is assigned to a specific partition residing within one or more of the identified locations. In operation, the location service 300 may rely on the entry 405 to identify those partitions (e.g., partition 403) of the partitions 401-403 within the identified location(s) that are mapped to a specific key range within the storage-account data. Third, the <objectKey> 430 is assigned to a specific object residing within one or more of the identified partitions. In operation, objects (e.g., object 445) of the objects 440 may be identified—within the identified partition(s) that are mapped to a specific article of data—based upon on the entry 405. This identification may be performed at the storage-stamp or partition level, while the location service 300 is mainly used to manage accounts across storage stamps without reaching down to the object level. For instance, the location service 300 may be configured to manage the location of a storage account (e.g., identity of the primary and secondary storage stamps in which the storage account is maintained) in addition to partition key ranges across storage stamps (e.g., utilized in at least storage-account migration).

As a result of the interaction between the location service 300 and the DNS table 400, the DNS table 400 is provisioned to reveal aspects (e.g., maintaining "account.windowsazure.net") pertaining to the specific address for each of the places within the distributed computing environment where a targeted object is maintained. This is true even when the address conventions in the different storage locations vary and/or when the division of storage-account key ranges varies between partitions residing at different storage locations. As such, this individuality of the stamps allows for individual load balancing on the respective stamps, as more fully discussed below with reference to FIG. 6.

Figure 5:
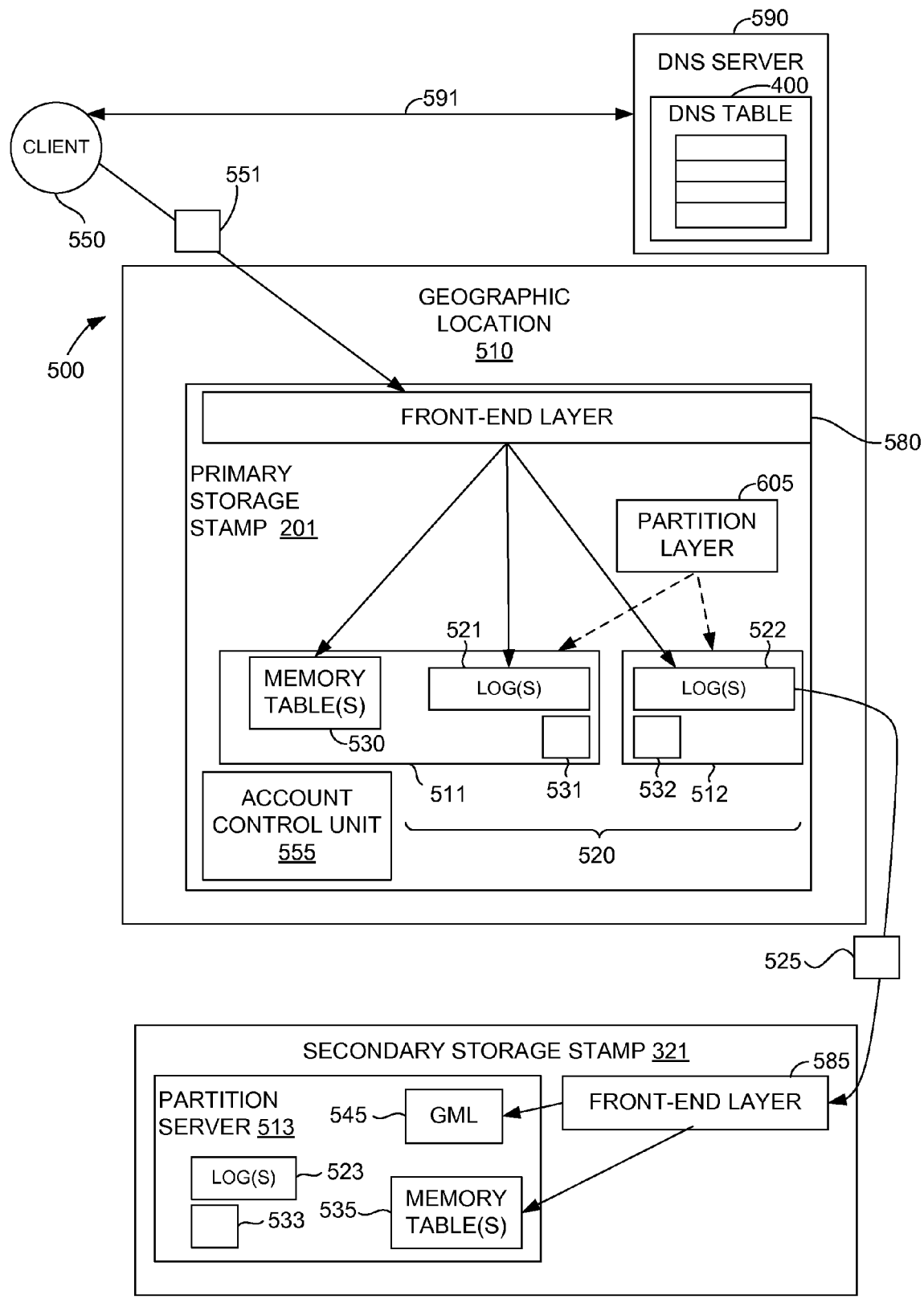
FIG. 5 depicts a block diagram of an exemplary distributed computing environment for carrying out replication between a primary and secondary storage stamp, in accordance with embodiments of the present invention.

Turning to FIG. 5, an exemplary methodology for carrying out replication will now be discussed. As illustrated in FIG. 5, a block diagram of an exemplary system 500 for inter-stamp replication of data is shown, in accordance with embodiments of the present invention. Inter-stamp replication, hereinafter "replication," of data is contemplated as occurring at a number of different levels within a distributed computing environment. For example, it is contemplated that data stored on a given storage stamp may be replicated to another storage stamp. Similarly, it is contemplated that data associated with a particular storage account may be replicated. Further, it is contemplated that a portion of data represented as a particular partition may be replicated. Thus, it is contemplated as being able to be performed at any level of granularity within the system.

In an exemplary embodiment, aspects of the present invention contemplate that replication occurs at the account level such that an account will have a primary location and one or more secondary location assigned thereto, where the secondary location(s) are geographically displaced from the primary location, as more fully discussed above. In addition, replication at the account level supports various types of failover for a specific storage account, involving migration from a first primary location to a second primary location. Additionally, replication at the account level allows a customer to turn off replication for a particular storage account to save resources and/or money, or to prevent interception of sensitive data at a distant geographic location.

Generally, the system 500 of FIG. 5 is comprised of a geographic location 510 that includes the primary storage stamp 201, which is replicating to a secondary storage stamp 321 residing on a geographic location physically removed from the geographic location 510. The primary storage stamp 201 is comprised of a plurality of partition servers 520, such as partition servers 511 and 512. The partition servers 511 and 512, in this example, are comprised of logs 521 and 522, respectively.

In one embodiment, an exemplary partition server may be comprised of a plurality of memory tables and/or a plurality of logs. For example, the log(s) of a partition server may be comprised of an update log, a block log, a page log, sender log, and/or a geo message log. Further, the log(s) may be located within a stream layer of the distributed computing environment 500 such that the log(s) represent a discrete data stream that is configured for append only. In operation, the stream layer may be relied upon to re-establish data of a storage stamp following a local failure of the storage stamp. For example, data may be committed to a storage stamp at a particular partition server. Following the failure of the partition server, the state of a partition hosted on the partition server is recreated, at least in part, by replaying one or more logs associated with that partition.

Data may not be considered committed to a particular storage stamp until it stored in one or more logs of the storage stamp, which may, in turn, cause the data to update one or more memory table(s) 530 and/or stream layers from which the data may be accessed by a requesting client (e.g., client 550). As such, the data that is committed as soon as it is written to an update log, a block log, or a page log of a storage stamp for purposes of geo-replication. However, the committed data that is written the GML of a storage stamp may not be accessible to the client 550 until the data is replayed on the storage stamp. Prior to or during replay, the memory table may be checkpointed to a data stream (e.g., typically after the data is committed). When checkpointing occurs, the data listed within the log can be truncated up to the last transaction held in the memory table as part of the checkpoint.

As will be discussed hereinafter in more detail, data may be replicated in a sequential (sync) or non-sequential (async) manner. A customer or the location service 300 may be provisioned to select which type (sync or async) of replication shall be carried out for a specific storage account. Sync-type replication may be used when a customer desires to ensure that all transactions are consistent and successful between the primary and secondary storage stamps. In operation, once the data is written to or modified on the primary storage stamp it is then written to the secondary storage stamp before committing the data and returning success indicator back to the client. That is, success is not returned back to the client until the transaction has been applied in both places. The price of using the sync-type replication is that the changes to data have a higher latency because the changes should be committed in more than one location successfully to be returned back to the client. Async-type replication commits any changes to the primary storage stamp that have successfully executed a request thereto and have sent out a related transaction, and lazily in the background replicates the changes to the secondary storage stamp. In operation, once the data is written to or modified on the primary storage stamp it will be considered committed and a success indicator will be sent back to the client. Eventually, the data written will be replicated to the storage account's secondary storage stamp, based on available bandwidth and other considerations. As such, async-type replication performs the replication off the critical path of the primary writes, thereby instilling service applications with expected fast latencies. However, when employing async-type replication, if there is a disaster and the primary storage stamp is lost, the recent updates to the storage accounts thereto can be lost.

Returning to FIG. 5, the primary storage stamp 201 and the secondary storage stamp 321 includes front-end layers 580 and 585 (e.g., Front Ends (FE's)), respectively. Further, the primary storage stamp 201 includes an account control unit (ACU) 555 for intercommunicating states (e.g., replicate on/off, migrate on/off, receive data on/off, etc.) between the location service 300 and the partitions 531 and 532. Further yet, the primary storage stamp 201 includes partition servers 511 and 512, while the secondary storage stamp 321 includes partition server 513. As with each of the components illustrated, the number and presence of a particular component on a location or stamp should not be construed as limiting, as the components of the system 500 are selected for explanation purposes solely.

The partition servers 511-513 are equipped with log(s) 521-523, respectively. These logs may represent differing types of logs that serve differing functions. For instance, the log(s) 522 on the partition server 512 may represent sender logs that, in cooperation with a sender engine, convert and deliver transactions 525 to the front-end layer 585 of the secondary storage stamp 321. In addition, the partition servers 511-513 support maintenance of partitions 531-533 of the data of a customer's storage account.

The partition server 513, in this example, is comprised of a geo message log (GML) 545, while memory table(s) 530 and 535, which are just caches of the data committed to the logs 521, 522, 523, are shown as being associated with the primary and secondary storage stamps 201 and 321, respectively. In other embodiments, the memory table(s) may be associated with specific partition servers. Accordingly, with respect to the partition server 513, it is contemplated that one or more memory tables and/or one or more logs may be utilized in a given partition.

The operation of the front-end layers 580 and 585 will now be discussed. Among other duties that the front-end layers 580 and 585 are configured to handle, the front-end layers 580 and 585 act to process an incoming message (holding one or more transactions 525), a message passed from one storage stamp to another storage stamp for replication purposes, to ensure the received data is intended to be committed to an associated storage stamp. The front-end layers 580 and 585 may also inspect the transactions 525 and present a message to identify a particular partition within the storage stamp to which the data is to be committed. The front-end layers 580 and 585 may also be responsible for forwarding messages to appropriate partition servers that, in turn, affect the log(s) thereon. Further, the front-end layer 585 of the of the secondary storage stamp may be responsible for accepting replication messages from the partition servers 520 on the front-end layer, reviewing the partition key ranges of the transactions carried within the messages, and transmitting the transactions to the relevant partition servers (e.g., partition server 513) within the secondary storage stamp 321 that are responsible for each respective partition key range. In this way, the front-end layer 585 acts as a dispatch mechanism that does not deal with logs or memory tables, and does not carry out committing the data. Instead, the partition server 585 is charged with managing the procedures of writing transactions to the logs for the purpose of committing the data to a relevant partition.

Generally the GML 545 operates as a message log, where the messages may provide acknowledgments of storing/committal of data, and/or provide an acknowledgment to one or more senders of the data as to the status of the data. In an exemplary embodiment, a message is written, almost immediately, upon receipt at the secondary data stamp 321 to the GML 545. This near immediate writing of the message may allow for the secondary storage stamp 321 to provide an acknowledgement back to a supplying primary storage stamp 201 that the data has been written (but may not have yet been committed) at the secondary storage stamp 321, in accordance with async-type replication. In this example of asynchronous replication, the primary storage stamp 201 can commit the transaction by writing to the logs 521 and return success to the customer, where the primary storage stamp 201 does not wait to send a message or perform the re-execution of some of the transactions 525 (e.g. carried in the message) on the secondary storage stamp 321. Consequently, the message is written to the GML 545, and then replayed (e.g., via a replay engine running on the partition server 513) at a later time.

This process of utilizing the GML 545 may decouple the primary storage stamp 201 from the secondary storage stamp 321 because the primary storage stamp 201 will not have its sending of messages blocked if there is a delay in replaying of the transactions 525 on the secondary storage stamp 321. If a delay does occur in a sender log (e.g., log(s) 522 of the partition server 512), as possible in the sync-type replication, the GML 545 may be invoked to prevent a build-up of pending transactions delivered by the messages. When the primary storage stamp 201 is blocked, then a backup at the sender engine may arise that generates latency in committing updates to storage-account data. However, in the case of async-type replication, when the secondary storage stamp 321 is keeping up with the primary storage stamp 201, the messages may be replayed directly from memory without having to use or, at least, read back from the GML 545.

It is contemplated that the GML 545 may be bypassed completely in one exemplary embodiment. That is, instead of routing the messages to the GML 545, incoming messages from the primary storage stamp 201 may be written directly to one or more log(s) 523 of the partition server 513 that directly support committing of data to the partition 533 (or a check pointing process).

An exemplary flow of data to be replicated is illustrated with reference to FIG. 5. For example, a request 551 to update data is received from the client 550 at the primary storage stamp 201. The request 551 may be addressed with a name of a customer's storage account and may be directed to a specific object via DNS server 590 translation of http(s)://account-Key.windowsazure.net/. Generally, when an account is created, the location service updates the DNS table 400 accessible on a DNS sever 590 so that future client 550 requests for the storage-account name can be translated into an address of a specific storage location. Accordingly, the DNS server 590 maintains data pertaining to the location of storage accounts and is updated by a location service (e.g., location service 300 of FIG. 4). In embodiments, the location service is also responsible for assigning and managing storage accounts across the storage stamps 201 and 321.

As shown, the DNS server 590 performs a translation 591 with regard to request 551 in order to provide the proper address(es) that match the storage accounts being affected. The results of the translation 591 are returned back to the client 550 and used for properly addressing the request 551. Then the client 550 caches these translation results and sends the request 551 to the front-end layer 580 on the appropriate stamp 201 based on the addressing determined for the request 551. The front-end layer 580, upon receipt of the request 551 from the client 550, performs a translation to determine which partition servers 520 are indicated by the address to receive the request 551.

In this example, the client 550 may be a service application or any other tenant of the cloud-computing service. Depending on what configuration settings are associated with a storage account, in this example, the data in the request 551 may be duplicated in a durable manner via asynchronous- or synchronous-type replication. However, for purposes of a general discussion, an asynchronous-type replication methodology is described hereinafter with reference to FIG. 5. It is understood that the flow of data may be altered for other types or configurations of replication.

The account control unit 555 may be configured to identify what storage accounts and what information within each storage account is intended to be replicated and how it is intended to be geo replicated. For example, the account control unit 555 may set the inter-stamp replication policies at the partition servers 520 of the primary storage stamp 201 for a storage account that desires replication. In particular, the account control unit 555 may be responsible for communicating account names and/or partition key ranges to the partition servers 520 along with corresponding information that establishes whether replication is enabled or not, and, when replication is enabled, the appropriate secondary stamp(s) to participate in the replication. As such, the partition servers 520 are provisioned to inspect the data within the request 551 and, in conjunction with the information provided from the account control unit 555, decides whether the data is earmarked for replication and where the replication is to occur.

As will be discussed hereinafter, the data may be annotated with one or more records to facilitate replay of the data at the secondary storage stamp 321. The annotated data, in this example, is communicated from the primary storage stamp 210 to the secondary storage stamp 321 by way of the network, as discussed above. The front-end layer 585 of the secondary storage stamp 321 receives the data, which may be in the form of a message carrying transactions 525. The front-end layer 585 may then identify one of the transactions 525 (e.g., portion within the data) that should be written to the GML 545 of the partition server 513. For example, a storage-account data associated with the transactions 525 may be committed to the partition 533 of the storage account residing on the partition server 513.

The portion of data communicated from the front-end layer 585 to the partition server 513 may then be written (e.g., persisted) to the GML 545 for later committal to the partition, where the partition server 513 serves up access to the partitions it has been previously assigned. In this exemplary asynchronous-type replication model, data eventually replayed from the GML 545, via the replay engine, may be committed to the partition served by partition server 513 and corresponds to data previously committed to one or more partitions served by partition servers 520 on the primary storage stamp 201.

Returning to the GML 545, in embodiments, an acknowledgement (not shown) may be communicated from the partition server 513, to the front-end layer 585, thereby indicating that the data has been written to the GML 545. As a result, the front-end layer 585, or on behalf of the front-end layer 585 by a service or control unit, communicates an acknowledgment of the persistence of the data to the primary storage stamp 201. In embodiments of the synchronous-type replication, a commit ID may be updated, generated, and/or communicated from the primary storage stamp 201 to the secondary storage stamp 321 as a result of receiving the acknowledgment. With respect to asynchronous-type replication, a success indicator of the replay of the data may be communicated to the client 550 soon after the request 551 was received by the partition servers 520 on the primary storage stamp 201. In this case, the success indicator may involve a commit ID transmitted from the partition server 512 for a specific partition thereon to the secondary storage stamp 321 to move the commit forward.

In an exemplary embodiment, the data communicated from the primary storage stamp 201 to the secondary storage stamp 321 is in the form of a batched message. A batched message includes a number of transactions 525 that may be destined for different partitions of a single storage account or of multiple storage accounts. The front-end layer 585 may identify the various transactions 525 within a batched message and forward the appropriate transactions to the appropriate partitions (e.g., 533), in this example. Continuing with this example, once the front-end layer 585 receives success from all of the partitions to which it sent transactions 525 from the message, the front-end layer 585 may send the acknowledgment to the primary storage stamp 201, or a particular primary (e.g., primary location 310 of FIG. 3) that was a source of the message. At this point in the example, the data at the secondary storage stamp 321 may not have been replayed from the GML 545 into one or more other log(s) 523, which may occur later asynchronously. The primary storage stamp 201, or a source partition server 512 of the primary storage stamp 201, may maintain the acknowledgements have been received back for accumulating a set of sequence numbers. Based on those acknowledgments received, the primary storage stamp 201, or the geographic location 510 that includes the primary storage stamp 201, determines if the commit ID can be advanced for inclusion with future geo messages.

It should be understood that the arrangement illustrated in FIG. 5 and other arrangements described herein are set forth only as examples. Other arrangements and elements (e.g., machines, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the components shown in FIG. 5 may be any type of computing device, such as computing device 100 described with reference to FIG. 1, for example. It should be understood that any number of data stores, partition servers, front ends, logs, networks, and/or memory tables may be employed within the system 500 within the scope of the present invention. Additionally other components not shown may also be included within the system 500. Accordingly, any number of components may be employed to achieve the desired functionality within the scope of embodiments of the present invention. Although the various components of FIG. 5 are shown with lines for the sake of clarity, in reality, delineating various components is not so clear. Further, although some components of FIG. 5 are depicted as single blocks, the depictions are exemplary in nature and in number and are not to be construed as limiting.

Figure 6:
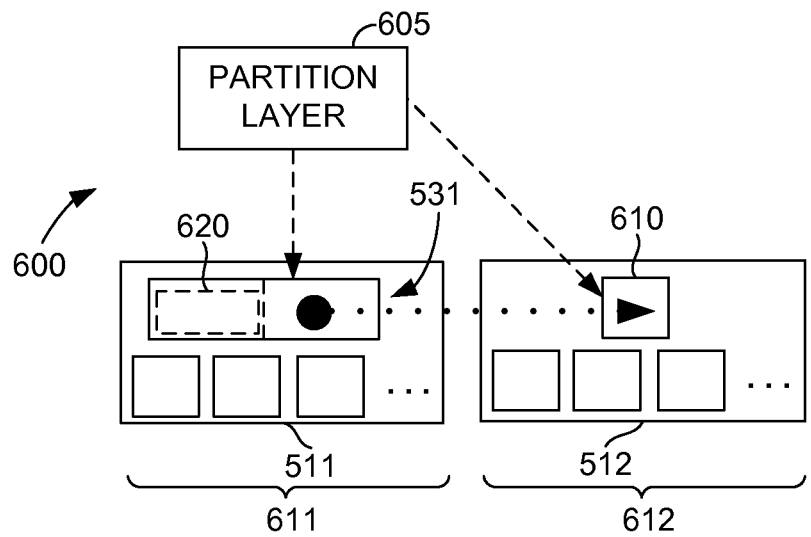
FIG. 6 depicts a block diagram for implementing an exemplary split operation, in accordance with aspects of the present invention.

Turning to FIG. 6, illustrating a block diagram of an exemplary system 600 for implementing a split operation as part of load balancing a partition, in accordance with embodiments of the present invention. As mentioned above, partition load balancing generally involves the targeted splitting and/or merging of partitions of a storage account. Generally, load balancing is conducted upon the primary and secondary partitions to ensure that they will bootstrap quickly, that live traffic from the primary partition during replication is not stalled, and that replay on the secondary partition will keep up with the live traffic and will not create a back-up of transactions. Generally, the speed at which the bootstrap/live traffic/replay are carried out is dictated by a customer's specifications in an SLA established for replication.

The system 600 illustrates a partition layer 605 (e.g., XPartition or XTable). This partition layer 605 within the storage stamp (e.g., primary storage stamp 201 of FIG. 5), in embodiments, acts to control the assignment of partitions 611 and 612 to partition servers 511 and 512 of FIG. 5, respectively, within a particular stamp. Further, the partition layer 605 governs load balancing within the particular stamp. Load balancing assists in distributing processing work between partition servers as requests (e.g., read, write, and delete requests) to manipulate partitions hosted on those partition servers arrive at a storage stamp. In exemplary embodiments, load balancing attempts to load balance across partition servers by either splitting or merging the partitions, associated with a particular storage account, that reside thereon, as well as reassigning partitions to different partition servers to load balance the load across partitions.

As discussed above, partitions for the particular storage account established on a primary storage stamp are allowed to be different in number and size than those partitions for the same storage account established on a secondary storage stamp, holding replicated storage-account data. This variance in partitions across storage stamps may result in discrepancies of load when processing requests from the primary storage stamp or the load on the secondary stamp (which is primary for other accounts). For instance stamp A is a primary for storage accounts SA1 and SA2 and secondary for storage accounts SA3 and SA5, stamp B is the primary for storage accounts SA3 and SA4 and the secondary for SA1 and SA6, and stamp C is the primary for storage accounts SA5 and SA6 and secondary for SA2 and SA4. Given the load to the different storage accounts each storage stamp will see a different amount of load since they have a different mixture of primary and secondary accounts. This will cause the partitioning of each stamp to be different, as each stamp is allocated a different amount of load to process. In addition, for stamps with secondary accounts, these stamps typically encounter write data for that secondary account while it is designated as a secondary to the primary account. Whereas, the stamp holding the primary account will see both read and write data.

With reference to FIG. 6, in order to reduce latency accompanying the large amount of time spent by the subject partition processing the load, the partition layer 605 acts to perform load balancing (e.g., split, merge, or offload) for a subject partition, shown as reference numeral 531 of FIG. 6. Generally, splitting the subject partition 531 attempts to distribute those partitions with a heavy processing load on the primary and/or secondary storage stamp across partition servers, such as the partition servers 511 and 512, in order to prevent delay or lag in carrying out a bootstrap, replication, or other operation. In one embodiment, a split may involve dividing a key range of a storage account represented by the subject partition 531 into two or more child partitions. In an exemplary embodiment, as illustrated in FIG. 6, the child partitions include a modified subject partition 620 with a diminished key range and a newly formed partition 610. This newly formed partition 610 is placed by the partition layer 605 on a partition server (e.g., partition server 512) that is distinct from the partition server 511 that the modified subject partition 620 is presently occupying. Further, the newly formed partition 610 includes a remainder of the key range that is not encompassed by the diminished key range of the modified subject partition. As such, the child partitions (modified subject partition 620 and newly formed partition 610) essentially split the original workload of the parent, subject partition 531.

As will be discussed more fully below, the split operation may be triggered by a number of parameters that are detected to overcome a predefined threshold. Often, parameters are triggered when two or more are detected to be overcoming respected thresholds at the same time. For instance, one parameter might pertain to whether or not a storage account has entered a bootstrap stage. Generally, the bootstrap stage refers to "bootstrapping" a storage account within a primary storage stamp to the same storage account on a secondary storage stamp in order to make an initial transfer of data, thereby catching up the storage account held on the secondary storage stamp to a current state of the storage account on the primary storage stamp. Once the secondary storage stamp is caught up to the current state of the storage account, the primary and secondary storage stamp may enter the inter-stamp replication phase that maintains the storage-account data of the secondary storage account current with the primary stamp, as described more fully above with reference to FIG. 5.

Provisioning a new storage account involves employing the location service to selecting at least two candidate stamps. One designated as the primary and other to be designated as the secondary storage stamp according to one or more of the following criteria: available storage capacity, type and configuration of resources, and geographic location. Once the candidate stamp is selected and designated as the primary or secondary storage stamp, the designation is stored at an ACU (e.g., account control unit 555 of FIG. 5), which may assist the location service in orchestrating the provisioning of the storage account by providing an account key, permission key, and other account information to help validate the storage account on the secondary storage stamp is authorized to receive data.

Next, the location service may direct the ACU on the primary storage stamp to execute and control the data-transfer portion of bootstrapping, which involves sending data between stamps from a beginning to an end of a key range for the storage account, thereby copying substantially all the data from the primary storage account over to the secondary storage account. In embodiments, this data is sent in the form of transactions (e.g., transactions 525 of FIG. 5) that are replayed on appropriate partition servers of the secondary storage stamp in order to commit the data. Sending data from the primary storage account typically involves the sender engine managing an organized distribution of transactions (e.g., according to sequence number and epoch number) from the logs (e.g., log(s) 521 and 522 of FIG. 5) associated with the partitions residing within the primary storage account. Replaying the transactions typically involves those steps described above when replaying a transaction during storage account replication. As such, bootstrapping involves partition servers undertaking a large amount of workload at both the primary and secondary storage stamps within a short period of time.

In another instance, bootstrapping involves rapidly catching up an existing secondary storage account to the current state of the primary storage account (i.e., resolving an occasion in which data is lost on the secondary stamp due to a disaster). In this instance, a complete data-transfer is not necessary. Instead, a checkpoint-based system may be applied to resend just those portions of data that not were lost on the secondary stamp for the storage account. In embodiments, the checkpoint-based system may insert "checkpoints" within log(s), or update logs, on partitions of both the primary and secondary storage stamps to signify successful replication. In this way, persistent data is marked as being stored when the memory tables have checkpoints inserted therein—causing the listing of transactions within the update logs to be truncated.

Upon detecting lost data, substantially all recent data (i.e., back to the latest verifiable checkpoint) within the checkpointed data stream and update log is contemporaneously pushed to the partition servers of the secondary storage stamp in order to replace the lost data or any other corrupt data stored on the secondary. Consequently, the designated checkpoints from the data stream and the update logs on the primary-storage-stamp side are flushed, while this newly generated backlog of data pushed to the log(s) of the partition servers on the secondary-storage-stamp side are replayed to commit the data to the partitions thereon. Accordingly, this type of update bootstrapping also incurs an extensive amount of time-sensitive workload at both the storage stamps involved.

Figure 7:
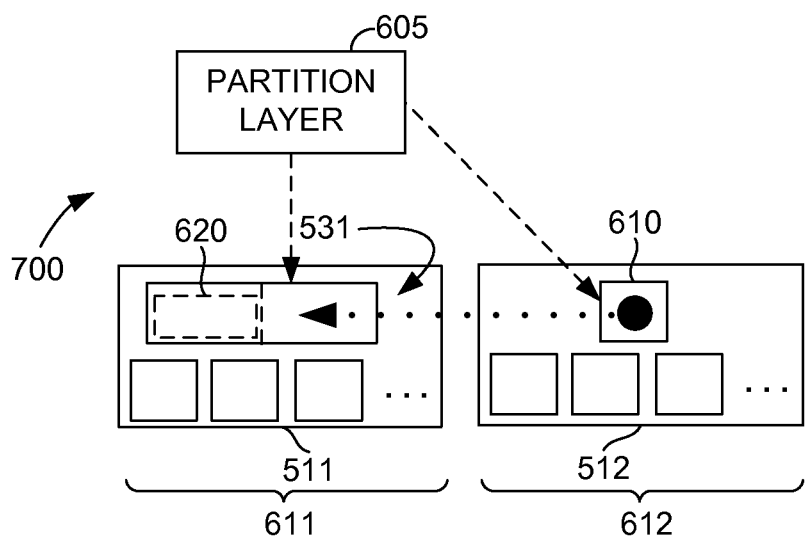
FIG. 7 depicts a block diagram for implementing an exemplary merge operation, in accordance with embodiments of the present invention.

Turning now to FIG. 7, a block diagram of an exemplary system 600 is shown for implementing a merge operation as part of load balancing a partition, in accordance with embodiments of the present invention. In embodiments, merge operations occur in response to a depletion in the workload assigned to partitions, in contrast to when split operations are triggered. For example, the partition layer 605 may trigger a merge operation between two parent partitions (e.g., modified subject partition 620 and newly formed partition 610) when a storage account has been inactive for a period of time, or upon completion of a bootstrap operation. Thus, merging allows for the consolidation of partitions (i.e., key ranges) of a storage account and reallocation of partition servers to address other storage accounts tackling higher workloads.

In operation, the merge operation, or "merging," combines two or more partitions into a single, child partition. Generally, as with splitting, the partition layer 605 is charged with triggering and controlling a merge. As illustrated in FIG. 7, partition layer 605 is shown as combining the partition 610 with the partition 620 to reform the child partition 531. Thus, a presence of the storage account is removed from the partition server 612 while a greater presence of the storage account (i.e., increased key range) is added to the partition server 611. Although a configuration of merging a previously split pair of partitions 610 and 620 has been described, it should be understood and appreciated that other types of suitable configurations for splitting and merging any number of partitions may be used, and that embodiments of the present invention are not limited to the recombination example described herein. Further, embodiments of the present invention are not limited to placing one child partition on the same partition server as the original parent partition, or reusing the partition server that previously supported a child partition when merging the parent partitions into a child partition. Even further, child partitions of different parent partitions (i.e., reorganizing child partitions that resulted from various splits) may be merged to form new aggregations of key ranges for a storage account.

Figure 8:
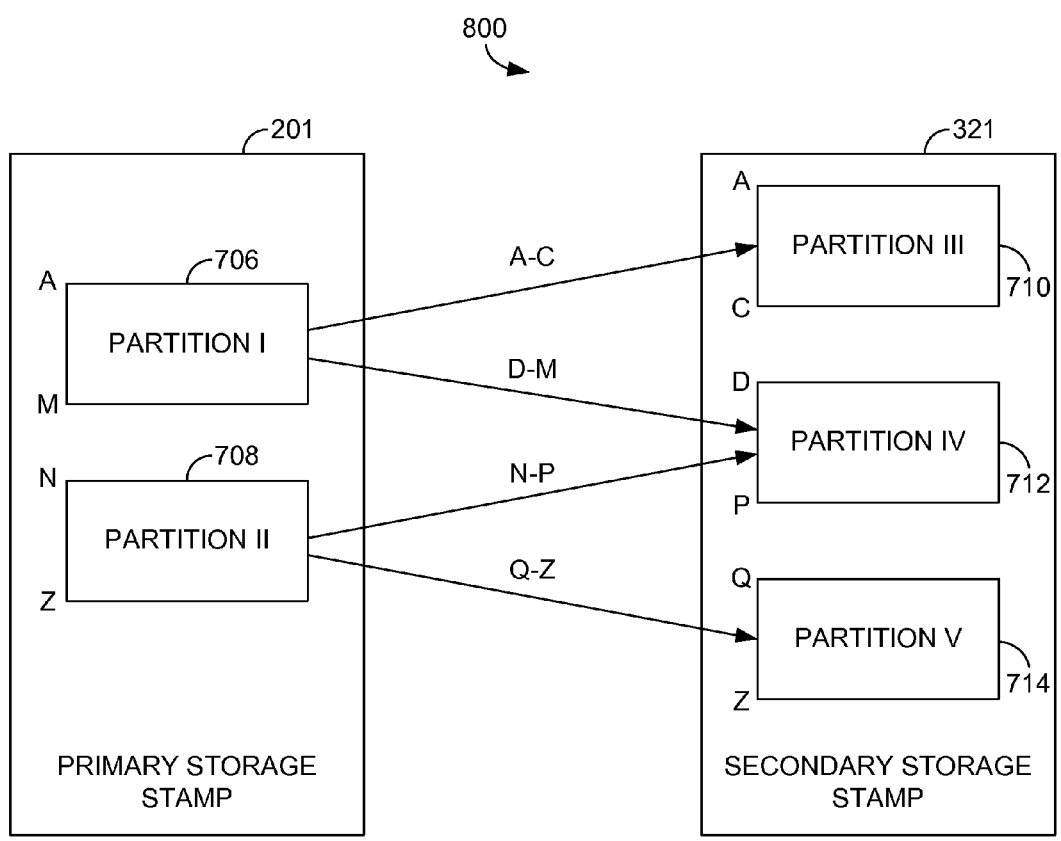
FIG. 8 depicts a block diagram illustrating an exemplary division of key ranges across partitions in separate storage stamps, in accordance with aspects of the present invention.

Turning now to FIG. 8, a block diagram is shown illustrating an exemplary division of key ranges across partitions I-V in separate storage stamps 201 and 321, respectively, in accordance with aspects of the present invention. Generally, the block diagram of FIG. 8, which is depicting a distributed computing system 800 having the primary storage stamp 201 and the secondary storage stamp 321 for a storage account interconnected, as described above, is provided for purposes of explaining how a destination partition (e.g., partition IV 712) may receive transactions from a plurality of source partitions (e.g., partitions I 706 and II 708).

It should be appreciated and understood that the primary and secondary storage stamps 201 and 321 are not designated as such with regard to the distributed computing system 800. Instead, the primary and secondary storage stamps 201 and 321 are designated as such with respect to each particular storage account. For example, a given storage stamp can be chosen as a primary storage stamp for one storage account, while the same storage stamp may be chosen as a secondary storage stamp for another storage account. Thus, a storage stamp may be assigned as a "primary" for some storage accounts and as a "secondary" for other storage accounts, thereby assuming different roles for different storage accounts hosted thereon.

In embodiments, a partition of the secondary storage stamp 321 may receive data from a single partition or from a plurality of partitions on the primary storage stamp 201. Accordingly, this disproportionate configuration of various source partitions targeting a single destination partition may trigger a load-balancing action by a service on the partition layer (e.g., partition layer 605) of the secondary storage stamp 321. This redistribution of the partitions on the primary and/or secondary storage stamp(s) helps prevent the partitions from experiencing a processing overload upon fielding transactions from various other partitions concurrently.

Initially, the primary storage stamp 201 is comprised of two partitions related to a particular storage account, which are the partitions I 706 and II 708. As illustrated, the partition I 706 includes data spanning key range of A through M. Meanwhile, the partition II 708 includes data spanning the key range of N through Z. Dissimilarly, the secondary storage stamp 321 is comprised of three partitions related to the particular storage account and that are intended to maintain the replicated data of key range A through Z. Therefore, an unparallel relationship between the storage stamps 201 and 321 exists, in this example, where the secondary storage stamp 321 is comprised of partitions III 710, IV 721, and V 713.

In operation, the partition III 710 is initially designated to receive and maintain data from the key range of A through C, the partition IV 712 is designated to receive and maintain data in the key range of D through P, and the partition V 714 is designated to receive and maintain data in the key range of Q through Z. In order to accomplish the task of committing data from a plurality of source partitions I 706 and II 708, one or more range buckets may be maintained at a partition layer of the secondary storage stamp 321. These range buckets function to track different commit IDs from the different source partitions I 706 and II 708. The range buckets may then be utilized by the secondary storage stamp 321 when replaying data from a log (e.g., GML) on the secondary storage stamp 321, or partition servers therein (not shown), to sequentially commit the data to the destination partitions III 710, IV 712, and V 714.

The utilization of range bucketing may be used in one embodiment to reduce the number of partitions utilized by the particular storage account. For example, the storage account may be utilizing two partitions on a hypothetical primary storage stamp, while the data could be using three partitions on the secondary storage stamp. If another secondary storage stamp is assigned to the storage account, this other secondary storage stamp would likely have different partitioning with respect the initial secondary storage stamp.

As illustrated in FIG. 8, the secondary storage stamp 321 is configured for receiving transactions from the primary storage stamp's 201 partitions 706 and 708, and for committing the storage account's data into three partitions 710, 712, and 714 during replication. Further yet, the concept of range bucketing may be implemented in situations where a GML at a secondary storage stamp 321 is unable to keep up with source partition(s) 706 and 708 conveying transactions thereto. In this situation, load balancing may be triggered such that the source partitions 706 and 708 split the data between two or more destination partitions 710, 712, and 714 on separate partition servers (not shown). In this example, the mechanism of range bucketing may be employed to facilitate later replay at each partition server where there exists a presence of a destination partition of the storage account. Further, in this example, each of the destination partitions that are created may have their own GML, which reduces the burden inherent in operating from just a single GML.

Applying the example above to the distributed computing environment 800 of FIG. 8, the comparatively large key range of D-P may prompt a split operation on the partition IV 712 of the secondary storage stamp 321, as the partition IV 712 may start lagging in replay of transactions when the associated storage account becomes active. Upon issuing the split operation, the partition IV 712 may be split among two or more partition servers on the secondary storage stamp 321. As such, the processing computing capacity allocated to the key range of D-P is multiplied. In one instance, upon performing the split operation, the child partitions of the partition IV 712 each address (e.g., replay) transactions within the key range of D-P in the GML, thereby sharing the total load. In another instance, the child partitions may be assigned a separate portion (e.g., D-M or N-P) of the key range of D-P to ensure there is no overlap during replication.

Figure 9:
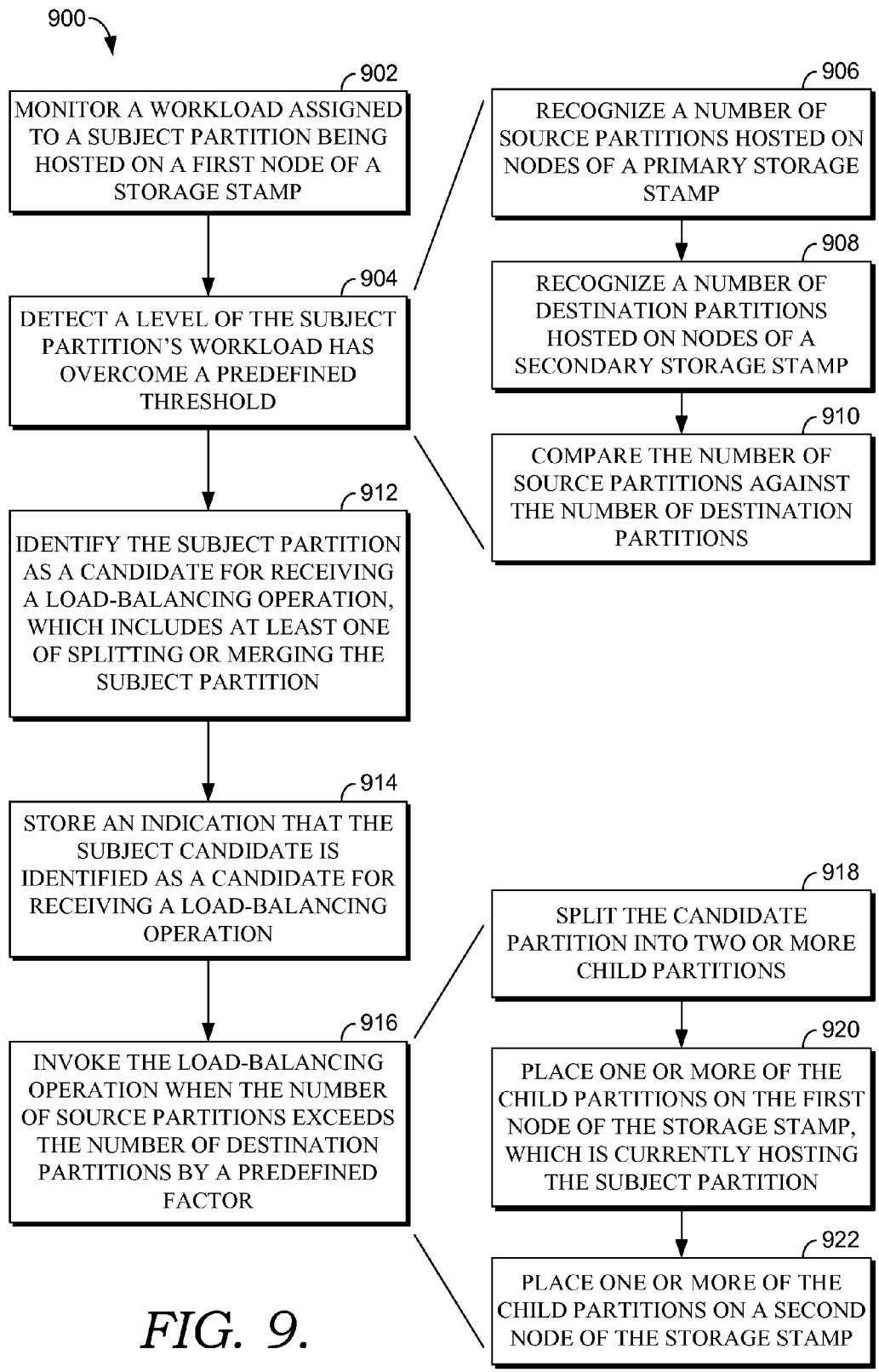
FIG. 9 depicts a methodology for identifying when to balance processing load(s) between nodes of an exemplary distributed computing environment, in accordance with embodiments of the present invention.

With reference to FIG. 9, a methodology 900 is depicted from the perspective of a service on a partition layer within a distributed computing system having both a primary storage stamp and a secondary storage stamp, in accordance with embodiments of the present invention. In embodiments, the methodology 900 is performed to identify when to balance processing load(s) between nodes of an exemplary distributed computing environment. It should be noted that although the terms "step" and "block" are used herein below to connote different elements of the methods employed for carrying out embodiments of the present invention, the terms should not be interpreted as implying any particular order among or between various steps herein disclosed unless and except when the order of individual steps is explicitly described.

Initially, the methodology 900 includes monitoring a workload assigned to a subject partition being hosted on a first node of a storage stamp, as indicated at block 902. Typically, as used herein, the subject partition represents a key range of data for a particular storage account. By way of example, monitoring workload may involve watching one or more of the following criteria: log size (e.g., pending transactions or requests) of a source partition during replication or bootstrapping; a GML size (e.g., pending transactions to reply) of a destination partition; a ratio of the source partitions to the destination partitions during bootstrapping; a rate (e.g., number of requests per second) of transaction traffic directed toward a destination partition; a central processing unit (CPU) load on the partition server hosting the partition; or a number of timeouts and/or throttled request that are occurring on the partition server. By way of example, each partition in the secondary storage stamp may know how many different partitions on the primary storage stamp are mapping thereto. Based on this information (e.g., if a large number of partitions are mapped to a single partition), a particular partition on the secondary storage stamp may independently elect to split in order to more evenly distribute the processing load. Further, the partition in the secondary storage stamp may know the partition key ranges assigned to the partitions mapped thereto based upon the buckets.

The methodology 900 also includes detecting that a level of the subject partition's workload has overcome a predefined threshold, as indicated at block 904. In one instance, detecting that the workload level has overcome the predefined threshold includes the following steps: recognizing a number of source partitions hosted on nodes of a primary storage stamp (see block 906); recognizing a number of destination partitions hosted on nodes of a secondary storage stamp (see block 908); and comparing the number of source partitions against the number of destination partitions (see block 910). This comparison of the number of source partitions to the number of destination partitions governs, in part, when to split or merge; thus, making efficient use of a storage stamp's available resources.

In other embodiments, load balancing on the primary storage stamp may be conducted during bootstrapping when a detected amount of data assigned to a single partition is too large (e.g., overcomes a predefined limit). In this case, the offending partition is split up into two or more child partitions in order to spread out the boostrapping load across a greater number of partition servers within the primary storage stamp. Also, if the storage account is concentrated onto just a small group of partitions (e.g., the number of partitions employed for a storage account fall below a threshold level), additional splitting is conducted to spread the storage account's data over more partition servers in order to speed up the bootstrapping process.

In yet other embodiments, load balancing on the secondary storage stamp may be conducted during bootstrapping when the GML gets too large. In this case, some or all of the original (parent) partitions may be split into child partitions, such that the data initially assigned to the parent partition is spread across a greater number of partition servers. Reducing the amount of data assigned to a particular partition allows the partition server hosting that partition to more expediently perform the replay of the data. Also, in order to avoid the replay falling behind, or if it falls behind, buckets (e.g., dictating the distribution of partition key ranges) are relied upon to guide how to perform partitioning of data between storage-account partitions on the secondary storage stamp. In operation, the buckets specify how many source partitions exist for a given destination partition and the partition key ranges assigned to the given destination partition, thereby revealing the amount of write traffic directed to each bucket. This allows the secondary to know how to best split the destination partition and the partition key ranges to split apart thereon.

In another embodiment, the CPU load of the subject partition server triggers an initial consideration for splitting or merging. In operation, once the CPU load overcomes a predetermined CPU load, then various qualifying factors, or criteria, may be examined to determine whether to trigger a split. These qualifying factors, as discussed above, may include log or GML size, the appearance that partition(s) are lagging the others, or a disproportionate number of source partitions with respect to destination partitions. With reference to the qualifying factor of disproportionate partitions, where the partition schemes on respective storage stamps are vastly offset (e.g., outside an acceptable metric), a split or a merge may be triggered to align the partitions in number such that there is a better correspondence between workload issued and workload received.

Upon detecting this increased workload on the subject partition, as indicated at block 912, the subject partition may be identified as a candidate for receiving a load-balancing operation. In embodiments, the load-balancing operation includes splitting and/or merging the subject partition, as discussed in more detail with reference to FIGS. 6 and 7. The fact that the subject partition is identified as a candidate for receiving a load-balancing operation may be stored in a record, as indicated at block 914. Or, the subject partition may be individually marked as currently fielding an undue amount of incoming transactions.

As a result, the subject partition may be scheduled for receiving a load-balancing operation, such as splitting or merging. In one embodiment, as indicated at block 916, the load-balancing operation is invoked when a number of source partitions exceeds a number of destination partitions by a predefined factor. In this embodiment, invoking the load-balancing operation may involve the following steps: splitting the candidate partition into two or more child partitions (see block 918); placing one or more of the child partitions on a first node of the storage stamp that hosted the subject partition (see block 920); and placing one or more of the child partitions on a second node of the storage stamp (see block 922).

Another embodiment that addresses a situation where a disproportionate number of source partitions exist with respect to destination partitions will now be discussed. By way of background, as mentioned previously, partitions on a primary storage stamp can be of vastly differing sizes. This can lead to extended periods of time to achieve completion of bootstrapping to the secondary storage stamp. For instance, during bootstrapping, there may exist a plurality of partitions that remain still working (e.g., replicating transactions) while other partitions have completed their work. To expedite completion at those remaining partitions, the work assigned to the remaining partitions may be split (e.g., pending transactions divided down the middle of the key range remaining to be bootstrapped). These splits may keep occurring in order to ensure available resources and/or processing capacity is fully utilized. By way of example, a service on the partition layer may iteratively spilt the remaining partitions until a substantial number of partition servers are hosting child partitions and are supporting bootstrapping for the storage account, thereby spreading out the bootstrap traffic over a majority of the partition servers.

For instance, when there exists N remaining partitions carrying out bootstrapping and there exists S partition servers available within the storage stamp, a service on the partition layer may continuously invoke splitting operations on remaining partitions when N<S until N=S. As some remaining partitions finish their work, the partition-layer service may continue to split the unfinished, remaining partitions to maintain N=S until bootstrapping is complete. Typically, once a remaining partition has less than a threshold level data left to bootstrap (e.g., X amount of GBs), no further splitting operations will be applied to it, as this remaining partition will likely finish its work quickly without additional help. As such, by splitting the bootstrapping over more partition servers, the network bandwidth from those partition servers is put into use, which allows the bootstrapping to be completed in less time.

Figure 10:
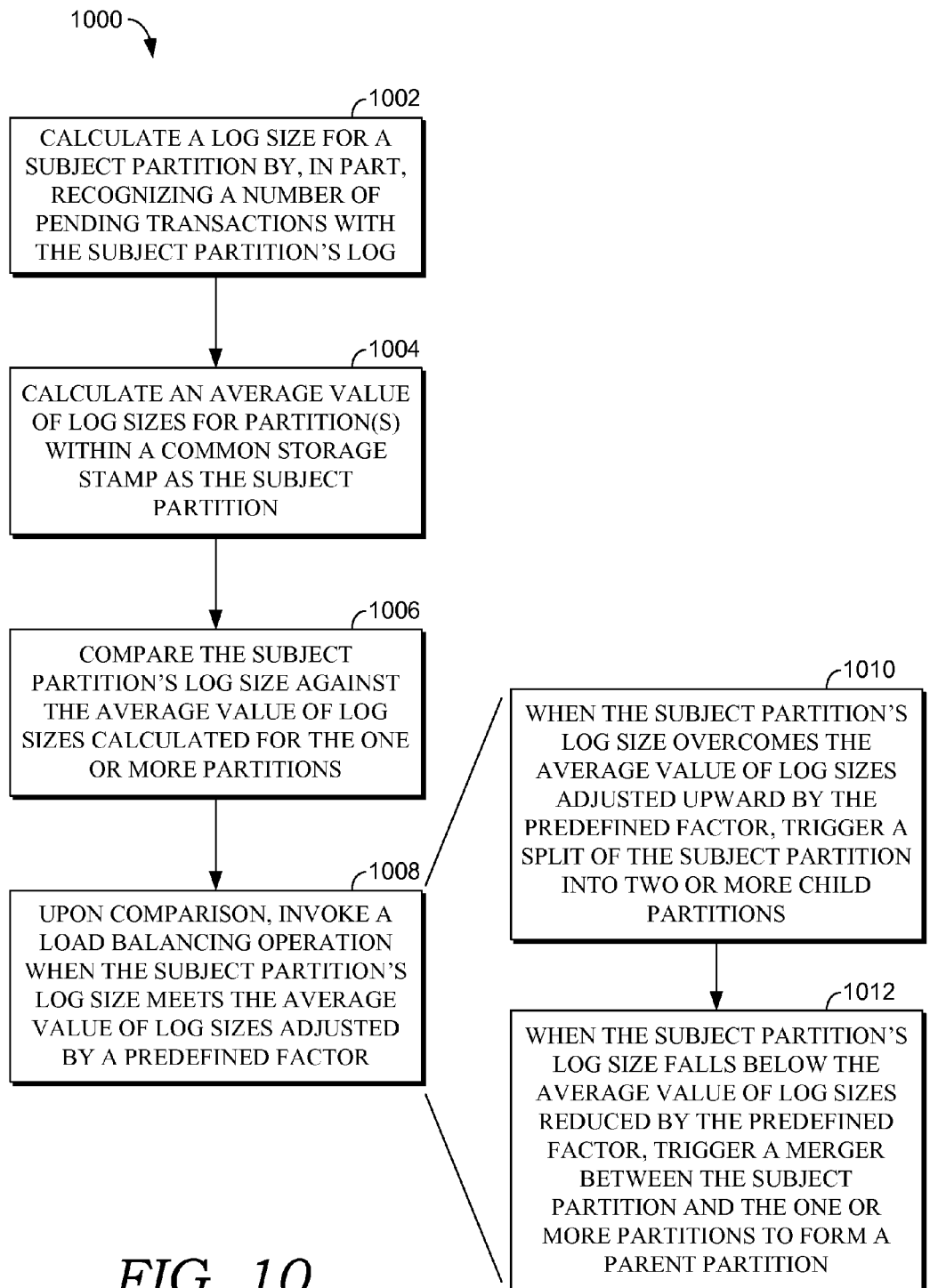
FIG. 10 depicts a methodology for triggering load-balancing operations on partitions of a storage account, in accordance with embodiments of the present invention.

Turning now to FIG. 10, a flow diagram that shows a methodology 1000 for triggering load-balancing operations on partitions of a storage account, in accordance with embodiments of the present invention. Generally, the methodology 1000 involves triggering load-balancing operations on partitions of a storage account by focusing on a partition's log size. Thus, of the criteria previously listed for determining when to invoke a load-balancing operation, FIG. 9 relates to the use of a number of bootstrapping partitions, while FIG. 10 relates to using the remaining log size that a source partition has to send or the remaining GML size that a destination partition has to receive and replay.

Generally, the methodology 1000 involves carrying out several calculations to ascertain whether a load-balancing operation is to be invoked. For instance, the methodology 1000 may include calculating a log size for a subject partition by, in part, recognizing a number of pending transactions with the subject partition's log, as indicated at block 1002. The process of recognizing may include the following steps: dynamically maintaining a record of pending transactions by increasing a count of the transactions as they are enqueued within a log and by decreasing the count as the transactions are replayed from the log; and tracking an approximate size (e.g., measured in bytes) of the data stream targeting the log. Upon recognizing the number of pending transactions and the approximate size of the log, these two criteria may be used individually or in combination to affect split(s) or merge(s) on the partitions associated with the log.

In another instance, the methodology 1000 may include calculating an average value of log sizes for partition(s) within a common storage stamp as the subject partition, as indicated at block 1004. Once the calculations above are carried out, as indicated at block 1006, the methodology 1000 continues with comparing the subject partition's log size against the average value of log sizes calculated for the one or more partitions. By way of example, if an amount of data in the sender logs of a subject source partition is more than a predefined multiplier of the average sender-log size measured from the other source partitions, then the subject partition may be split. Upon invoking the split, each of the child partitions inherit the subject (parent) partition's region within the sender log and act to process the transactions that belong to its own key range after the split. As an approximation, the child partitions may consider the log size of this region inherited from the parent partition to be half of the actual log size of the region, as the child partitions now share the responsibility for completing the work specified by the region. Similarly, a grandchild partition (i.e., split from a child partition) considers the log size of the region inherited from a grandparent partition to be a quarter of the actual log size of the region. As such, the effect of splitting is immediately visible to prevent unnecessary additional split operations. In other embodiments, a source partition may be considered for a split if its log size resides above a predetermined maximum limit (e.g., one half a terabyte), while the source partition may be excluded from being split if its log size resides below a predetermined minimum limit (e.g., one gigabyte). Generally, the sender log size is considered for splitting the source partition during both bootstrapping and replication, or "live send," such that live-send data is not accumulated in few source partitions.

A similar log-size based splitting approach may be followed for dealing with large GML sizes, which holds transactions to be replayed on the destination partitions. Accordingly, in some instances, a group of subject partitions may be designated as both a destination and a source (e.g., during a migration) such that the subject partitions are collecting data in logs to send out, collecting data in a GML to replay, and, perhaps, disproportionate in number to another set of partitions that are interacting therewith. In this case, at least three separate qualifying factors will be independently measured/calculated for the subject partitions to identify whether to invoke a load-balancing operation thereon.

Returning to FIG. 10, as indicated at block 1008, a load balancing operation is invoked when the subject partition's log size meets the average value of log sizes adjusted by a predefined factor. In an exemplary embodiment, invoking the load-balancing operation includes one or both of the following steps: when the subject partition's log size overcomes the average value of log sizes adjusted upward by the predefined factor, triggering a split of the subject partition into two or more child partitions (see block 1010); or when the subject partition's log size falls below the average value of log sizes reduced by the predefined factor, triggering a merge between the subject partition and the one or more partitions to form a child partition (see block 1012). However, upon invoking a merge, the partition-layer service may abstain from executing the merge upon accessing that, if a merge were to occur, the resultant (child) partitions will express attributes that exceed one or more of the other predefined thresholds mentioned above (e.g., large log or GML size). That is, if any qualifying factors that would trigger a split would be met, then a merge is not implemented. In another instance, the partition-layer service may abstain from executing the merge upon accessing that bootstrapping is occurring on the subject partitions.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. While certain methodologies have been described in a particular sequence, it is contemplated that those activities may be performed in a variety of order and sequences.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method in a distributed computing environment utilizing a processor and memory for identifying when to balance at least one processing load between nodes of the distributed computing environment, the method comprising:

monitoring a workload assigned to a subject partition being hosted on a first node of a storage stamp, wherein the subject partition represents a key range of data for a particular storage account, and wherein the storage stamp represents at least one of a primary storage stamp that includes the nodes configured for hosting a number of source partitions or a secondary storage stamp that includes the nodes configured for hosting a number of destination partitions, and wherein the primary storage stamp and the secondary storage stamp are configured to support replicating the data of the particular storage account between the primary storage stamp and the secondary storage stamp, wherein the primary storage stamp and secondary storage stamp individually maintain replicas of the data for the particular storage account;

detecting a level of the subject partition's workload has overcome a predefined threshold;

identifying the subject partition as a candidate for receiving a load-balancing operation, wherein the load-balancing operation comprises at least one of splitting, merging, or load balancing the subject partition; and storing in a record, at least temporarily, an indication that the subject candidate is identified as a candidate for receiving a load-balancing operation.

2. The method of claim 1, wherein monitoring the workload assigned to the subject partition comprises measuring a rate of traffic conveying requests targeting the subject partition or measuring rate of overload-related timeouts experienced by the subject partition.

3. The method of claim 1, wherein detecting the level of the subject partition's workload has overcome the predefined threshold comprises:

recognizing a number of source partitions hosted on nodes of the primary storage stamp;

recognizing a number of destination partitions hosted on nodes of the secondary storage stamp;

comparing the number of source partitions against the number of destination partitions; and upon comparison, invoking the load-balancing operation when the number of source partitions exceeds the number of destination partitions by a predefined factor.

4. The method of claim 3, wherein the load-balancing operation comprises:

splitting the candidate partition into two or more child partitions; and placing one or more of the child partitions on the first node of the storage stamp that hosted the subject partition.

5. The method of claim 1, wherein the load-balancing operation further comprises placing one or more of the child partitions on a second node of the storage stamp.

6. The method of claim 1, wherein the data in the primary storage stamp and the secondary storage stamp, are associated with partitions that are load-balanced to support at least on of the following:

bootstrapping between the primary storage stamp and the secondary storage stamp upon occurrence of a failover;

maintaining the flow of live traffic from the primary storage stamp to the secondary storage stamp during replication; and ensuring that replay on a subject partition on the secondary storage stamp keeps pace with the live traffic at the primary storage stamp.

7. The method of claim 1, wherein the subject partition represents a source partition, and wherein detecting a level of the subject partition's workload has overcome a predefined threshold comprises deriving a value of the subject partition's log size as a function of pending transactions within a log, associated with the subject partition, that remain undelivered to one or more destination partitions.

8. The method of claim 7, wherein, upon comparison of the subject partition's log size against the average value of log sizes, invoking the load-balancing operation when the subject partition's log size exceeds the average value of log sizes by a predefined factor.

9. The method of claim 1, wherein the subject partition represents a destination partition, and wherein detecting a level of the subject partition's workload has overcome a predefined threshold comprises deriving a value of the destination partition's log size as a function of pending transactions within a geo message log (GML), associated with the subject partition, that remain unexecuted.

10. The method of claim 9, further comprising:

deriving an average value of GML sizes for destination partitions hosted on the secondary storage stamp, wherein the destination partitions and the subject partition represent data of a common storage account;

comparing the destination partition's log size against the average value of GML sizes derived from the destination partitions; and upon comparison of the subject partition's GML size against the average value of GML sizes, invoking the load-balancing operation when the subject partition's GML size exceeds the average value of GML sizes by a predefined factor.

11. One or more computer-storage media having computer-executable instructions embodied thereon, that when executed by a computing system having a processor and memory, cause the computing system to perform a method for triggering load-balancing operations on partitions of a storage account, the method comprising:

for a subject partition being hosted on a node of a storage stamp, wherein the storage stamp represents at least one of a primary storage stamp that includes the nodes configured for hosting a number of source partitions or a secondary storage stamp that includes the nodes configured for hosting a number of destination partitions, and wherein the primary storage stamp and the secondary storage stamp are configured to support replicating the data of the particular storage account between the primary storage stamp and the secondary storage stamp, wherein the primary storage stamp and secondary storage stamp individually maintain replicas of the data for the particular storage account;

calculating a log size for the subject partition, wherein the subject partition represents a key range of the storage account hosted on a first partition server;

calculating an average value of log sizes for one or more partitions within a common storage stamp as the subject partition, wherein the one or more partitions and the subject partition represent data of a common storage account;

comparing the subject partition's log size against the average value of log sizes calculated for the one or more partitions;

upon comparison, invoking a load balancing operation when the subject partition's log size meets the average value of log sizes adjusted by a predefined factor, wherein invoking the load-balancing operation comprises:

(a) when the subject partition's log size overcomes the average value of log sizes adjusted upward by the predefined factor, triggering a split of the subject partition into two or more child partitions; or (b) when the subject partition's log size falls below the average value of log sizes reduced by the predefined factor, triggering a merge between the subject partition and the one or more partitions to form a child partition.

12. The media of claim 11, wherein the pending transactions within the subject partition's log represent at least one of transactions that remain undelivered to one or more destination partitions, or transactions that remain uncommitted to the subject partition.

13. The media of claim 12, wherein the split of the subject partition into two or more child partitions involves placing one or more of the child partitions on the first partition server and placing one or more of the child partitions on a second partition server of a storage stamp that hosts the first partition server.

14. The media of claim 13, wherein the two or more child partitions serve to divide execution or delivery of the pending transactions listed within the subject partition's log.

15. The media of claim 11, wherein the method further comprises recognizing that the primary storage stamp is actively bootstrapping data of the storage account to the secondary storage stamp, wherein the first partition server resides on either the primary storage account or the secondary storage account.

16. The media of claim 15, wherein the method further comprises abstaining from triggering a merge upon recognizing that the primary storage stamp is actively bootstrapping data to the secondary storage stamp.

17. The media of claim 16, wherein invoking the load-balancing operation further comprises at least one of abstaining triggering a merge between the subject partition and the one or more partitions or triggering a split of the subject partition upon determining the calculated log size for the subject partition overcomes a maximum limit.

18. A computer system within a distributed networking environment for controlling load balancing of partitions, the system comprising:
   a primary storage stamp that includes one or more first partition servers that host one or more source partitions, wherein the one or more source partitions represent a key range of initial data associated with a storage account;
   a secondary storage stamp that includes one or more second partition servers that host one or more destination partitions, wherein the one or more destination partitions represent a key range of replicated data associated with the storage account, wherein the replicated data substantially mirrors content of the initial data, and wherein the one or more source partitions and the one or more destination partitions disagree in number, and wherein the primary storage stamp and the secondary storage stamp are configured to support replicating the data of the particular storage account between the primary storage stamp and the secondary storage stamp, wherein the primary storage stamp and secondary storage stamp individually maintain replicas of the data for the particular storage account; and
   a service within a partition layer of either the primary storage stamp or the secondary storage stamp, wherein the service acts to increase or decrease instances of the one or more source partitions or one or more destination partitions such that they more closely correspond in number.

19. The system of claim 18, wherein the service is further configured to increase or decrease instances of the one or more source partitions or one or more destination partitions based on at least one of an amount of data to be applied to a particular partition or overall size of the particular partition, wherein the amount of data to be applied is a function of transactions presently enqueued within a log associated with the particular partition and a checkpoint data stream targeting the log.

20. The system of claim 18, wherein the service is further configured to increase or decrease instances of the one or more source partitions or one or more destination partitions based upon monitoring a flow of networking traffic and triggering load-balancing operations based upon the monitored flow, or where throttling of the networking traffic flow invokes the service to initiate splitting, merging, or offloading with regard to the one or more source partitions or one or more destination partitions.

* * * * *